United States Patent
Harrison et al.

(10) Patent No.: US 12,535,408 B2
(45) Date of Patent: Jan. 27, 2026

(54) SPECTROSCOPY SYSTEMS AND METHODS FOR ANALYZING LIQUIDS AT VACUUM ULTRAVIOLET (VUV) WAVELENGTHS

(71) Applicant: VUV Analytics, Inc., Cedar Park, TX (US)

(72) Inventors: Dale A. Harrison, Albany, NY (US); Anthony T. Hayes, Leander, TX (US)

(73) Assignee: VUV Analytics, Inc., Cedar Park, TX (US)

( * ) Notice: Subject to any disclaimer, the term of this patent is extended or adjusted under 35 U.S.C. 154(b) by 179 days.

(21) Appl. No.: 18/636,395

(22) Filed: Apr. 16, 2024

(65) Prior Publication Data

US 2025/0321183 A1    Oct. 16, 2025

(51) Int. Cl.
*G01N 21/33* (2006.01)
*G01N 21/05* (2006.01)
(Continued)

(52) U.S. Cl.
CPC ............. *G01N 21/33* (2013.01); *G01N 21/05* (2013.01); *G01N 21/631* (2013.01); *G01N 30/74* (2013.01);
(Continued)

(58) Field of Classification Search
None
See application file for complete search history.

(56) References Cited

U.S. PATENT DOCUMENTS

| 4,132,653 A | 1/1979 | Samson |
|---|---|---|
| 4,440,013 A | 4/1984 | Adams |

(Continued)

FOREIGN PATENT DOCUMENTS

| CN | 102890049 | 1/2013 |
|---|---|---|
| CN | 119574408 | 3/2025 |

(Continued)

OTHER PUBLICATIONS

Bruin et al., "Optimization And Evaluation Of The Performance Of Arrangements For UV Detection In High-Resolution Separations Using Fused-Silica Capillaries", Journal of Chromatorgaphy, 1991, 19 pgs.

(Continued)

*Primary Examiner* — Hoon K Song
(74) *Attorney, Agent, or Firm* — Egan, Enders & Huston LLP.

(57) ABSTRACT

The present disclosure provides a vacuum ultraviolet (VUV) detector for use with a liquid chromatography (LC) system (otherwise referred to herein as an LC-VUV detector) for the study of liquids. The LC-VUV detector incorporates an ultra-short pathlength flow cell into the LC-VUV detector to render liquid samples at least semi-transparent to VUV light. The ultra-short pathlength flow cell is specifically designed to: (a) interface with a focused beam of VUV light, (b) provide zero 'dead' volume, resulting in perfectly laminar flow through the flow cell, and (c) be modular and removable, allowing flow cells of different pathlength to be used within the LC-VUV detector. Methods for analyzing liquid samples using the LC-VUV detector and flow cell disclosed herein are also provided in the present disclosure.

28 Claims, 17 Drawing Sheets

(51) Int. Cl.
*G01N 21/63* (2006.01)
*G01N 30/74* (2006.01)
*G01N 30/78* (2006.01)
*G01N 30/02* (2006.01)

(52) U.S. Cl.
CPC ....... *G01N 30/78* (2013.01); *G01N 2021/335* (2013.01); *G01N 2030/027* (2013.01); *G01N 2201/0227* (2013.01)

(56) References Cited

U.S. PATENT DOCUMENTS

| | | | |
|---|---|---|---|
| 4,577,122 | A | 3/1986 | Kung |
| 4,587,835 | A | 5/1986 | Adams |
| 4,614,871 | A | 9/1986 | Driscoll |
| 4,668,091 | A | 5/1987 | Lagesson et al. |
| 4,776,690 | A | 10/1988 | Quimby |
| 4,822,166 | A | 4/1989 | Rossiter |
| 5,065,025 | A | 11/1991 | Doyle |
| 5,083,450 | A | 1/1992 | Grindstaff |
| 5,302,272 | A | 4/1994 | Klein |
| 5,312,535 | A | 5/1994 | Waska et al. |
| 5,484,571 | A * | 1/1996 | Pentoney, Jr. ............ G01J 1/04 356/417 |
| 5,864,427 | A | 1/1999 | Fukano et al. |
| 6,188,813 | B1 | 2/2001 | Dourdeville et al. |
| 6,305,213 | B1 | 10/2001 | Lagesson et al. |
| 6,368,560 | B1 | 4/2002 | Ostrander et al. |
| 6,834,069 | B1 | 12/2004 | Bergmann et al. |
| 7,067,818 | B2 | 6/2006 | Harrison |
| 7,095,497 | B2 | 8/2006 | Kishikawa et al. |
| 7,126,131 | B2 | 10/2006 | Harrison |
| 7,391,030 | B2 | 6/2008 | Harrison |
| 7,476,852 | B2 | 1/2009 | Bonne et al. |
| 7,485,869 | B2 | 2/2009 | Harrison et al. |
| 7,574,601 | B2 | 8/2009 | Jahromi et al. |
| 7,684,037 | B2 | 3/2010 | Harrison et al. |
| 7,705,312 | B2 | 4/2010 | Ellis et al. |
| 8,233,146 | B2 * | 7/2012 | Chen ............ G01N 21/05 356/246 |
| 8,841,626 | B2 | 9/2014 | Vozka et al. |
| 9,116,158 | B2 | 8/2015 | Harrison et al. |
| 9,116,159 | B2 | 8/2015 | Harrison et al. |
| 10,641,749 | B2 | 5/2020 | Harrison et al. |
| 10,677,767 | B2 | 6/2020 | Harrison et al. |
| 2003/0098419 | A1 | 5/2003 | Ji et al. |
| 2006/0289809 | A1 | 12/2006 | Bonne et al. |
| 2007/0182965 | A1 | 8/2007 | Kamlet et al. |
| 2008/0014574 | A1 | 1/2008 | Viator et al. |
| 2009/0029870 | A1 | 1/2009 | Ward et al. |
| 2009/0170149 | A1 | 7/2009 | Viator et al. |
| 2011/0292677 | A1 | 12/2011 | Rossiter |
| 2011/0299084 | A1 | 12/2011 | Feitisch et al. |
| 2014/0145087 | A1 | 5/2014 | Vozka et al. |
| 2014/0192343 | A1 * | 7/2014 | Harrison ............ G01N 21/85 73/23.35 |
| 2015/0059440 | A1 | 3/2015 | Harrison et al. |
| 2015/0090014 | A1 | 4/2015 | Goto et al. |
| 2015/0330955 | A1 | 11/2015 | Farnsworth et al. |
| 2017/0248515 | A1 * | 8/2017 | Duckett, Jr. ....... G01N 21/0303 |
| 2018/0238845 | A1 | 8/2018 | Eliason et al. |
| 2019/0376938 | A1 | 12/2019 | Harrison et al. |
| 2023/0296489 | A1 | 9/2023 | Cox-Muranami et al. |
| 2025/0208035 | A1 * | 6/2025 | Mennicken ............ G01N 21/05 |

FOREIGN PATENT DOCUMENTS

| | | |
|---|---|---|
| DE | 202007000374 | 1/2007 |
| EP | 1406110 B1 | 4/2004 |
| EP | 3730461 | 10/2020 |
| GB | 1138711 | 1/1969 |
| JP | S5124913 | 7/1976 |
| JP | S52152288 | 12/1977 |
| JP | S5428683 | 3/1979 |
| JP | S56132547 | 10/1981 |
| JP | S57113353 | 7/1982 |
| JP | S6066155 | 4/1985 |
| JP | S61149833 | 7/1986 |
| JP | S61162735 | 7/1986 |
| JP | 61-204546 | 9/1986 |
| JP | 3-97653 | 10/1991 |
| JP | 2730924 | 12/1997 |
| JP | 2000298094 | 10/2000 |
| JP | 2003202266 | 7/2003 |
| JP | 2016161455 | 9/2016 |
| KR | 20180059480 | 6/2018 |
| WO | 2011147602 A2 | 12/2011 |
| WO | 2012/018299 A1 | 2/2012 |
| WO | 2012018298 | 2/2012 |
| WO | 2012018298 A1 | 2/2012 |
| WO | 2012033443 A1 | 3/2012 |
| WO | 2012126470 | 9/2012 |
| WO | 2012121651 A1 | 9/2013 |

OTHER PUBLICATIONS

"Invitation To Pay Additional Fees And, Where Applicable, Protest Fee and Written Opinion Of The International Searching Authority", PCT/US2025/023576, Jul. 10, 2025, 12 pgs.

Notification of Transmital of The International Search Report and The Written Opinion Of The International Searching Authority, Or The Declaration, PCT/US2025/023576, Sep. 1, 2025, 19 pgs.

"Notification Of Transmittal Of The International Search Report And The Written Opinion Of The International Searching Authority, Or The Declaration", International Filing Date Apr. 8, 2025, Application No. PCT/US2025/023570, Date of Mailing Jul. 2, 2025, 10 pgs.

Horton et al., "A Triple Reflection Polarizer For Use In The Vacuum Ultraviolet", Applied Optics, vol. 8, No. 3, Mar. 1969, 4 pgs.

Morris et al., "Single Rochon Prisms For Light Polarization Between 1400-70,000 A", Applied Optics, vol. 8, No. 6, Jun. 1969, 2 pgs.

Chandrasekharan et al., "Birefringent Lens Polarizer For The Vacuum Ultraviolet", Applied Optics, vol. 10, No. 3, Mar. 1971, 2 pgs.

Walker, "Pile Of Plates Polarizer For The Vacuum Ultraviolet", Applied Optics, vol. 3, No. 12, Dec. 1964, 4 pgs.

Yang et al., "Tunable Thin Film Polarizer For The Vacuum Ultraviolet And Soft X-ray Spectral Regions", Journal Of Applied Physics, 2007, 4 pgs.

Remneva et al., "Polarizer Of Radiation In The Vacuum Ultraviolet (60-200 nm)", Zhurnal Prikladnoi Spektroskopii, vol. 25, No. 6, 1975, 4 pgs.

Johnson, "Magnesium Fluoride Polarizing Prism For The Vacuum Ultraviolet", Department of Chemistry, University Of Washington, 1964, 2 pgs.

Robin et al., "Micaceious Biotite As Efficient Brewster Angle Polarizer For Vacuum Ultraviolet", The Review Of Scientific Instruments, vol. 37, No. 7, 1966, 3 pgs.

Gaskell, "Electrospray: Principles And Practice", Journal of Mass Spectrometry, vol. 32, 1997, 12 pgs.

Driscoll et al., "Determination Of Water And Oxygen At Low PPM Levels By GC/Far UV Detection", American Laboratory, 1988, 8 pgs.

International Search Report, PCT/US13/63841, Mar. 10, 2014, 2 pgs.

International Preliminary Report on Patentability, PCT/US13/63841, Apr. 21, 2015, 8 pgs.

Eckhardt et al., "Fiber Optic Detection Device For GC-UV", SPIE, vol. 6433, 2007, 7 pgs.

Eckhardt et al., "Fibre Optic UV Systems For Gas And Vapour Analysis", Journal Of Physics: Conference Series 85, 2007, 7 pgs.

VuV Analytics, Inc., Supplementary Partial European Search Report, PCT/US2013/063841, Apr. 28, 2016, 9 pgs.

Hatzinikolaou et al., "Analysis Of The Gas Phase Of Cigarette Smoke By Gas Chromatography Coupled With UV-Diode Array Detection", Anal. Chem. 2006, 8 pgs.

VUV Analytics, "Vacuum Ultraviolet Absorption Spectroscopy System And Methods", EP Application No. 18180564.9, Extended Search Report, Oct. 15, 2018, 13 pgs.

(56) References Cited

OTHER PUBLICATIONS

Harrison et al., "Flow Cells And Methods For Analyzing Liquids At Vacuum Ultraviolet (VUV) Wavelengths", U.S. Appl. No. 18/636,392, filed Apr. 16, 2024, 75 pgs.

Harrison et al., "Spectroscopy Systems And Methods For Analyzing Liquids At Vacuum Ultraviolet (VUV) Wavelengths With Enhanced Sensitivity", U.S. Appl. No. 18/636,398, filed Apr. 16, 2024, 74 pgs.

* cited by examiner

SPECTROSCOPY SYSTEMS AND METHODS FOR ANALYZING LIQUIDS AT VACUUM ULTRAVIOLET (VUV) WAVELENGTHS

RELATED APPLICATION

The present disclosure is related to U.S. Pat. No. 10,641,749, which is entitled "Vacuum Ultraviolet Absorption Spectroscopy System and Method," filed May 16, 2019 and hereby incorporated herein in its entirety.

BACKGROUND OF THE INVENTION

The present disclosure relates to the field of optical spectroscopy. More specifically, it provides a means by which vacuum ultraviolet (VUV) light may be employed to facilitate spectroscopy of matter in the VUV region.

Vacuum ultraviolet (VUV) light is strongly absorbed by virtually all forms of matter. Hence, from a theoretical viewpoint VUV spectroscopy might be expected to provide an ideal means of probing such. Unfortunately, in practice realizations of VUV-based spectroscopy systems have remained largely elusive due to a lack of suitable (i.e., efficient) components and demanding environmental considerations. As a result, relatively little effort has been directed towards exploiting this region of the electromagnetic spectrum.

It follows that there would be great benefit associated with overcoming these difficulties and developing VUV spectroscopy systems that could be used to investigate a wide range of materials. It would be further advantageous if such systems could be readily coupled with established analytical techniques so as to facilitate integration into existing laboratories with minimum effort and expense.

SUMMARY OF THE INVENTION

The present disclosure provides a vacuum ultraviolet (VUV) spectroscopy system that is particularly well suited to the investigation of liquids. More specifically, the present disclosure provides a VUV detector for use with a liquid chromatography (LC) system (otherwise referred to herein as an LC-VUV detector) for the study of liquids. The LC-VUV detector disclosed herein incorporates an ultra-short pathlength flow cell into the LC-VUV detector to render liquid samples at least semi-transparent to VUV light. As described in more detail below, the ultra-short pathlength flow cell is designed to: (a) interface with a focused light beam, (b) provide zero 'dead' volume, resulting in perfectly laminar flow through the flow cell, and (c) be modular and removable, allowing flow cells of different pathlength to be used within the LC-VUV detector. Additional advantages of the ultra-short pathlength flow cell are discussed in more detail below.

According to one embodiment, a flow cell for use with a liquid chromatography (LC) system is provided herein. The flow cell generally includes a flow cell housing, a sample tube provided within the flow cell housing, an aperture coupled to receive a focused beam of VUV light and a plurality of positioning elements provided within the flow cell housing to position the sample tube at a focal point of the focused light beam. The sample tube is a cylindrical tube, which is optically transmissive at vacuum ultra-violet (VUV) wavelengths and coupled to receive a flow of liquid from the LC system. The focused beam of VUV light received by the aperture passes through the sample tube and the flow of liquid flowing through the sample tube. A width of the aperture is smaller than a diameter of the sample tube to ensure that the focused beam of VUV light received by the aperture passes through the sample tube and not around the sample tube.

The diameter of the sample tube may generally correspond to an optical pathlength of the flow cell. In some embodiments, the diameter of the sample tube may range between 25 µm and 530 µm. In some embodiments, a width of the aperture may be less than one-half of the diameter of the sample tube. In some embodiments, the aperture may be tapered to increase a solid angle of the focused beam of VUV light passing through the sample tube.

In some embodiments, the plurality of positioning elements may include a precision tube guide. The precision tube guide may generally include a first channel that extends along a longitudinal axis of the precision tube guide, and a second channel that extends through the precision tube guide in a direction perpendicular to the longitudinal axis of the precision tube guide. The sample tube may be inserted within the first channel of the precision tube guide to position a cross-sectional area of the sample tube in a plane perpendicular to the longitudinal axis of the precision tube guide. An opening on one side of the second channel may provide the aperture, which is coupled to receive the focused beam of VUV light. In some embodiments, the plurality of positioning elements may further include a first positioning element to secure a position of the precision tube guide within the flow cell housing, and a second positioning element to secure a position of the sample tube within the flow cell housing and align a center of the sample tube with a center of the second channel of the precision tube guide.

According to another embodiment, a flow cell for use with a liquid chromatography (LC) system is provided herein. The flow cell generally includes a flow cell housing, a sample tube provided within the flow cell housing, wherein the sample tube is a cylindrical tube, which is optically transmissive at vacuum ultra-violet (VUV) wavelengths and coupled to receive a flow of liquid from the LC system, and a precision tube guide provided within the flow cell housing to position the sample tube at a focal point of a focused beam of VUV light. As noted above, the precision tube guide may generally include a first channel that extends along a longitudinal axis of the precision tube guide, and a second channel that extends through the precision tube guide in a direction perpendicular to the longitudinal axis of the precision tube guide. The sample tube may be inserted within the first channel to position a cross-sectional area of the sample tube in a plane perpendicular to the longitudinal axis of the precision tube guide. The second channel provides an optical path through the flow cell that permits the focused beam of VUV light to pass through the sample tube and the flow of liquid flowing through the sample tube.

As noted above, the diameter of the sample tube may generally correspond to an optical pathlength of the flow cell. In some embodiments, the diameter of the sample tube may range between 25 µm and 530 µm. In some embodiments, an opening on one side of the second channel may provide an aperture to receive the focused beam of VUV light. In some embodiments, a width of the aperture may be smaller than a diameter of the sample tube to ensure that the focused beam of VUV light received by the aperture passes through the sample tube and not around the sample tube. In some embodiments, a width of the aperture may be less than one-half of the diameter of the sample tube.

In some embodiments, the optical pathlength of the flow cell is changed by inserting a new precision tube guide and a new sample tube into the flow cell housing. The new precision tube guide may generally include a third channel that extends along a longitudinal axis of the new precision tube guide to position a cross-sectional area of the new sample tube in a plane perpendicular to the longitudinal axis of the new precision tube guide, and a fourth channel that extends through the new precision tube guide in a direction perpendicular to the longitudinal axis of the new precision tube guide. An opening on one side of the fourth channel may provide a second aperture, which is coupled to receive the focused beam of VUV light, and the fourth channel may provide an optical path through the flow cell that permits the focused beam of VUV light to pass through the new sample tube and the flow of liquid flowing through the new sample tube. A diameter of the new sample tube may differ from the diameter of the sample tube.

According to another embodiment, a method is provided herein that utilizes the flow cell disclosed herein to determine at least one analyte in a flow of liquid. The method may generally begin by passing a flow of liquid provided by a liquid chromatography (LC) system through a flow cell. The flow cell used in this method embodiment may generally include a flow cell housing and a sample tube, which is provided within the flow cell housing for receiving the flow of liquid from the LC system. The sample tube is a cylindrical tube, which is optically transmissive at vacuum ultra-violet (VUV) wavelengths.

The method may further include exposing the flow of liquid to VUV light as the flow of liquid passes through the sample tube of the flow cell. The flow cell may further include a precision tube guide, which is provided within the flow cell housing for positioning the sample tube at a focal point of the VUV light. The precision tube guide may include: (a) an aperture that is coupled to receive the VUV light, and (b) an optical path through the flow cell that permits the VUV light received by the aperture to pass through the sample tube and the flow of liquid flowing through the sample tube.

In some embodiments, the method may expose the flow of liquid to VUV light by directing a focused beam of the VUV light to the aperture provided within the precision tube guide. In some embodiments, the width of the aperture may be smaller than a diameter of the sample tube to ensure that the focused beam of VUV light received by the aperture passes through the sample tube and not around the sample tube. In one exemplary embodiment, the width of the aperture may be less than one-half of the diameter of the sample tube. The diameter of the sample tube generally corresponds to an optical pathlength of the flow cell. In some embodiments, the diameter of the sample tube may range between 25 μm and 530 μm to provide a flow cell 300 with an ultra-short pathlength.

The method may further include detecting a portion of the VUV light that is transmitted through the optical path provided within the precision tube guide and the flow of liquid passing through the sample tube, and determining at least one analyte within the flow of liquid based on said detecting.

In some embodiments, the method may expose the flow of liquid to a wavelength of VUV light that is less than 200 nm. In such embodiments, the method may detect the portion of the VUV light that is transmitted through the optical path provided within the precision tube guide and the flow of liquid passing through the sample tube by detecting an intensity of the portion of the VUV light that is transmitted through the flow of liquid at the wavelength. The method may then use the detected intensity of the portion of the VUV light transmitted through the flow of liquid at the wavelength to calculate: (a) a transmittance through the flow of liquid at the wavelength, or (b) an absorbance of the at least one analyte at the wavelength. The method may then determine the at least one analyte within the flow of liquid based on: (a) the transmittance through the flow of liquid at the wavelength, or (b) the absorbance of the at least one analyte at the wavelength.

According to another embodiment, a vacuum ultraviolet (VUV) spectroscopy system that utilizes the flow cell disclosed herein to determine at least one analyte in a flow of liquid is provided herein. The VUV spectroscopy system may generally include a light source configured to provide vacuum ultra-violet (VUV) light at one or more VUV wavelengths, and a flow cell coupled to receive a flow of liquid from a liquid chromatography (LC) system. The flow cell may generally include: (a) a flow cell housing, (b) a sample tube provided within the flow cell housing to receive the flow of liquid from the LC system, wherein the sample tube is a cylindrical tube, which is optically transmissive at the one or more VUV wavelengths, and (c) a precision tube guide provided within the flow cell housing to position the sample tube at a focal point of the VUV light. As noted above, the precision tube guide may generally include: (a) an aperture that is coupled to receive the VUV light, and (b) an optical path through the flow cell that permits the VUV light received by the aperture to pass through the sample tube and the flow of liquid flowing through the sample tube before exiting the flow cell. The VUV spectroscopy system may further include a detector, which is coupled to detect a portion of the VUV light that is transmitted through the flow of liquid flowing through the sample tube.

In some embodiments, the precision tube guide may further include a first channel that extends along a longitudinal axis of the precision tube guide, and a second channel that extends through the precision tube guide in a direction perpendicular to the longitudinal axis of the precision tube guide. The sample tube may be inserted within the first channel to position a cross-sectional area of the sample tube in a plane perpendicular to the longitudinal axis of the precision tube guide. The second channel provides the optical path through the flow cell that permits the VUV light to pass through the sample tube and the flow of liquid flowing through the sample tube. An opening on one side of the second channel provides the aperture, which is coupled to receive the VUV light.

In some embodiments, the VUV spectroscopy system may further include a first VUV optic, which is coupled between the light source and the flow cell to direct a focused beam of the VUV light to the aperture provided within the precision tube guide. In some embodiments, a width of the aperture may be smaller than a diameter of the sample tube to ensure that the focused beam of VUV light received by the aperture passes through the sample tube and not around the sample tube. In some embodiments, the width of the aperture may be less than one-half of the diameter of the sample tube. The diameter of the sample tube may generally correspond to an optical pathlength of the flow cell. In some embodiments, the diameter of the sample tube may range between 25 μm and 530 μm.

In some embodiments, the VUV spectroscopy system may further include a second VUV optic, which is coupled to receive the VUV light transmitted through the flow of liquid flowing through the sample tube. In such embodiments, an optical path extending between the first VUV optic and the second VUV optic may be optically aligned with the optical path through the flow cell.

In some embodiments, the VUV spectroscopy system may further include a chamber housing containing at least the flow cell, the first VUV optic and the second VUV optic, where the chamber housing provides a controlled environment. In some embodiments, the chamber housing may include one or more optical alignment paths through which the aperture may be illuminated to align the optical path extending between the first VUV optic and the second VUV optic with the optical path through the flow cell. In some embodiments, the flow cell may be removably coupled to the chamber housing. In other embodiments, the flow cell may be fixedly attached to the chamber housing.

In some embodiments, the chamber housing may include a flow cell port that is configured to receive and position the flow cell within the chamber housing. The flow cell port may extend through the chamber housing in a direction, which is perpendicular to the optical path extending between the first VUV optic and the second VUV optic. In some embodiments, the flow cell may be removably coupled to the flow cell port. In some embodiments, the flow cell housing may include one or more alignment pins for grossly aligning the flow cell within the flow cell port. When the flow cell is received within the flow cell port, the one or more alignment pins may couple with one or more holes provided within the flow cell port to align the flow cell within the flow cell port and ensure that the sample tube is positioned at the focal point of the VUV light.

In some embodiments, the VUV spectroscopy system may further include a plurality of seals, which are coupled between the flow cell housing and the flow cell port. The plurality of seals prevent air or gas outside of the flow cell from reaching a detection area within the flow cell when the flow cell is received within the flow cell port.

In some embodiments, the flow cell port may be configured to receive a second flow cell having an optical pathlength, which differs from an optical pathlength of the flow cell, when the flow cell is removed from the flow cell port. Like the flow cell, the second flow cell may generally include: (a) a second flow cell housing, (b) a second sample tube provided within the second flow cell housing to receive the flow of liquid from the LC system, and (c) a second precision tube guide provided within the second flow cell housing to position the second sample tube at a focal point of the VUV light. The second sample tube may be a cylindrical tube, which is optically transmissive at the one or more VUV wavelengths. The second precision tube guide may generally include: (a) a second aperture that is coupled to receive the VUV light, and (b) a second optical path through the second flow cell that permits the VUV light received by the second aperture to pass through the second sample tube and the flow of liquid flowing through the second sample tube before exiting the second flow cell. However, a diameter of the second sample tube provided within the second flow cell may differ from a diameter of the sample tube provided within the flow cell to provide the second flow cell with the optical pathlength, which differs from the optical pathlength of the flow cell.

According to another embodiment, a method is provided herein that allows flow cells of different optical pathlength to be used to determine at least one analyte in a flow of liquid. The method may generally begin by passing a first flow of liquid provided by a liquid chromatography (LC) system through a first flow cell comprising a first flow cell housing and a first sample tube, which is provided within the first flow cell housing for receiving the first flow of liquid from the LC system. The first sample tube may be a cylindrical tube, which is optically transmissive at vacuum ultra-violet (VUV) wavelengths.

The method may further include exposing the first flow of liquid to VUV light as the first flow of liquid passes through the first sample tube of the first flow cell. The first flow cell may further include a first precision tube guide, which is provided within the first flow cell housing for positioning the first sample tube at a focal point of the VUV light. The first precision tube guide may include: (a) a first aperture that is coupled to receive the VUV light, and (b) a first optical path through the first flow cell that permits the VUV light received by the first aperture to pass through the first sample tube and the first flow of liquid flowing through the first sample tube before exiting the first flow cell.

The method may further include detecting a portion of the VUV light that is transmitted through the first optical path provided within the first precision tube guide and the first flow of liquid passing through the first sample tube, and determining at least one analyte within the first flow of liquid based on said detecting.

In some embodiments, the method may expose the first flow of liquid to a wavelength of VUV light that is less than 200 nm. In such embodiments, the method may detect the portion of the VUV light that is transmitted through the first optical path provided within the first precision tube guide and the first flow of liquid passing through the first sample tube by detecting an intensity of the portion of the VUV light that is transmitted through the first flow of liquid at the wavelength. The method may then use the detected intensity of the portion of the VUV light transmitted through the first flow of liquid at the wavelength to calculate: (a) a transmittance through the first flow of liquid at the wavelength, or (b) an absorbance of the at least one analyte at the wavelength. The method may then determine the at least one analyte within the first flow of liquid based on: (a) the transmittance through the first flow of liquid at the wavelength, or (b) the absorbance of the at least one analyte within the first flow of liquid at the wavelength.

In some embodiments, the method may further include removing the flow cell from the LC-VUV detector, inserting a second flow cell within the LC-VUV detector, the second flow cell having an optical pathlength that differs from the flow cell, passing a second flow of liquid provided by the LC system through the second flow cell inserted within the LC-VUV detector, and exposing the second flow of liquid to the VUV light as the second flow of liquid passes through the second sample tube of the second flow cell.

The second flow cell may generally include a second flow cell housing, a second sample tube provided within the second flow cell housing to receive the second flow of liquid from the LC system, and a second precision tube guide provided within the second flow cell housing to position the second sample tube at the focal point of the VUV light. Like the sample tube, the second sample tube may be a cylindrical tube, which is optically transmissive at the one or more VUV wavelengths. However, a diameter of the second sample tube may differ from a diameter of the sample tube to provide the second flow cell with the optical pathlength that differs from the optical pathlength of the flow cell. The second precision tube guide comprises: (a) a second aperture that is coupled to receive the VUV light, and (b) a second optical path through the second flow cell that permits the VUV light received by the second aperture to pass through the second sample tube and the second flow of liquid flowing through the second sample tube before exiting the second flow cell.

In some embodiments, the method may further include detecting a portion of the VUV light that is transmitted through the second optical path provided within the second precision tube guide and the second flow of liquid flowing through the second sample tube, and determining at least one analyte within the second flow of liquid based on said detecting.

In some embodiments, the method may expose the second flow of liquid to a wavelength of VUV light that is less than 200 nm. In such embodiments, the method may detect the portion of the VUV light that is transmitted through the second optical path provided within the second precision tube guide and the second flow of liquid passing through the second sample tube by detecting an intensity of the portion of the VUV light that is transmitted through the second flow of liquid at the wavelength. The method may then use the detected intensity of the portion of the VUV light transmitted through the second flow of liquid at the wavelength to calculate: (a) a transmittance through the second flow of liquid at the wavelength, or (b) an absorbance of the at least one analyte at the wavelength. The method may then determine the at least one analyte within the second flow of liquid based on: (a) the transmittance through the second flow of liquid at the wavelength, or (b) the absorbance of the at least one analyte within the second flow of liquid at the wavelength.

It may be desirable to change the optical pathlength of the flow cell for a variety of reasons. For example, when the analyte and the mobile phase solvent included within the first flow of liquid are both absorbing at the wavelength of the VUV light, the method may further include selecting the optical pathlength of the second flow cell to improve detection of the analyte at the wavelength of the VUV light. When the analyte included within the second flow of liquid differs from the analyte included within the first flow of liquid, the method may further include selecting the optical pathlength of the second flow cell to enable determination of the analyte within the second flow of liquid. When the second flow of liquid is exposed to VUV light to induce photolysis within the second flow of liquid, the method may further include selecting the optical pathlength of the second flow cell to create conditions conducive to observing the photolysis within the second flow of liquid.

According to another embodiment, a vacuum ultraviolet (VUV) spectroscopy system is provided herein that utilizes: (a) an absorption contrast between at least one analyte and a mobile phase solvent to determine the at least one analyte in a flow of liquid, or (b) photolysis of the at least one analyte or the mobile phase solvent to enhance detection of the at least one analyte. The VUV spectroscopy system may generally include a light source configured to provide vacuum ultra-violet (VUV) light, and a flow cell coupled to receive the VUV light provided by the light source and a flow of liquid from a liquid chromatography (LC) system. The flow of liquid may be exposed to the VUV light as the flow of liquid flows through the flow cell. The flow of liquid may generally include a mobile phase solvent and at least one analyte to be analyzed, where the mobile phase solvent and the at least one analyte both exhibit absorbance at one or more wavelengths of the VUV light used to detect the at least one analyte. The VUV spectroscopy system may further include a detector that is coupled to detect a portion of the VUV light that is transmitted through the flow of liquid at the one or more wavelengths of the VUV light. The detected portion of the VUV light may be used to detect the at least one analyte.

In some embodiments, the flow cell utilized within the VUV spectroscopy system may include a flow cell housing, a sample tube provided within the flow cell housing to receive the flow of liquid from the LC system and a precision tube guide provided within the flow cell housing to position the sample tube at a focal point of the VUV light. As noted above, the sample tube may be a cylindrical tube, which is optically transmissive at the one or more wavelengths of the VUV light. The precision tube guide may generally include: (a) an aperture that is coupled to receive the VUV light, and (b) an optical path through the flow cell that permits the VUV light received by the aperture to pass through the sample tube and the flow of liquid flowing through the sample tube before exiting the flow cell.

As noted above, the mobile phase solvent and the at least one analyte included within the flow of liquid may both exhibit absorbance at one or more wavelengths of the VUV light used to detect the at least one analyte. In some embodiments, the one or more wavelengths of the VUV light may be below an ultra-violet (UV) cut-off for the mobile phase solvent. In some embodiments, the mobile phase solvent may be more absorbing than the at least one analyte at the one or more wavelengths of the VUV light used to detect the at least one analyte.

In some embodiments, the mobile phase solvent may be selected to increase an absorbance contrast between the at least one analyte and the mobile phase solvent at the one or more wavelengths of the VUV light used to detect the at least one analyte, and thus, enhance a detection sensitivity to the at least one analyte. In some embodiments, the mobile phase solvent may be less absorbing than the at least one analyte at the one or more wavelengths of the VUV light used to detect the at least one analyte. In such embodiments, the absorbance contrast may be positive. In other embodiments, the mobile phase solvent may be more absorbing than the at least one analyte at the one or more wavelengths of the VUV light used to detect the at least one analyte. In such embodiments, the absorbance contrast may be negative.

In some embodiments, additional techniques may be used to further enhance the detection sensitivity to the at least one analyte. For example, at least one of a buffer, a modifier, or an additive may be added to the mobile phase solvent to increase the absorbance contrast and further enhance the detection sensitivity to the at least one analyte. Additionally or alternatively, an optical pathlength of the flow cell may be selected to further enhance the detection sensitivity to the at least one analyte.

In some embodiments, the VUV light provided by the light source may induce photolysis in the flow of liquid as the flow of liquid flows through the flow cell. The photolysis induced within the flow of liquid may enhance detection of the at least one analyte. In some embodiments, the photolysis may enhance detection of the at least one analyte by modifying the at least one analyte. In other embodiments, the photolysis may enhance detection of the at least one analyte by modifying the mobile phase solvent. In yet other embodiments, the photolysis may enhance detection of the at least one analyte in light of a second analyte included within the flow of liquid. In some embodiments, a second detector may be coupled to receive the flow of liquid exiting the flow cell, and the second detector may be configured to detect a result of the photolysis.

In some embodiments, the photolysis induced within the flow of liquid may be controlled to adjust an extent to which the photolysis enhances detection of the at least one analyte. In some embodiments, the photolysis may be controlled by one or more of the following: adjusting a power output of the light source; adjusting a spectral output of the light source; adjusting a flow rate of the flow of liquid through the flow cell; and providing the flow cell with a coating applied on an interior of the flow cell.

According to another embodiment, a method is provided herein to detect at least one analyte in a flow of liquid based on the absorbance of the at least one analyte at one or more wavelengths of VUV light. The method may generally include: (a) passing a flow of liquid provided by a liquid chromatography (LC) system through a flow cell, wherein the flow of liquid comprises a mobile phase solvent and at least one analyte to be analyzed; (b) exposing the flow of liquid to vacuum ultra-violet (VUV) light as the flow of liquid passes through the flow cell, wherein the mobile phase solvent and the at least one analyte both exhibit absorbance at one or more wavelengths of the VUV light used to detect the at least one analyte; (c) detecting an intensity of a portion of the VUV light that is transmitted through the flow of liquid at the one or more wavelengths of the VUV light; (d) using the detected intensity of the portion of the VUV light transmitted through the flow of liquid at the one or more wavelengths of the VUV light to calculate an absorbance of the at least one analyte at the one or more wavelengths of the VUV light; and (e) detecting the at least one analyte within the flow of liquid based on the absorbance of the at least one analyte at the one or more wavelengths of the VUV light.

Prior to passing the flow of liquid through the flow cell in step (a), the method may further include selecting the mobile phase solvent so as to increase an absorbance contrast between the at least one analyte and the mobile phase solvent at the one or more wavelengths of the VUV light. By increasing the absorbance contrast, the method may enhance a detection sensitivity to the at least one analyte.

In some embodiments, the mobile phase solvent that is selected may be less absorbing than the at least one analyte at the one or more wavelengths of the VUV light. In such embodiments, the absorbance contrast between the at least one analyte and the mobile phase solvent may be positive at the one or more wavelengths of the VUV light.

In some embodiments, the mobile phase solvent that is selected may be more absorbing than the at least one analyte at the one or more wavelengths of the VUV light. In such embodiments, the absorbance contrast between the at least one analyte and the mobile phase solvent may be negative at the one or more wavelengths of the VUV light.

In some embodiments, the method may further include adding at least one of a buffer, a modifier or an additive to the mobile phase solvent, prior to passing the flow of liquid through the flow cell, to increase the absorbance contrast and further enhance the detection sensitivity to the at least one analyte.

According to another embodiment, a method that utilizes photolysis to enhance detection of at least one analyte is provided herein. The method may generally include: (a) passing a flow of liquid provided by a liquid chromatography (LC) system through a flow cell, wherein the flow of liquid comprises a mobile phase solvent and at least one analyte to be analyzed; (b) exposing the flow of liquid to vacuum ultra-violet (VUV) light as the flow of liquid passes through the flow cell, wherein the mobile phase solvent and the at least one analyte both exhibit absorbance at one or more wavelengths of the VUV light used to detect the at least one analyte, and wherein the VUV light induces photolysis in the flow of liquid as the flow of liquid passes through the flow cell; (c) detecting an intensity of a portion of the VUV light that is transmitted through the flow of liquid at the one or more wavelengths of the VUV light; (d) using the detected intensity of the portion of the VUV light transmitted through the flow of liquid at the one or more wavelengths of the VUV light to calculate an absorbance of the at least one analyte at the one or more wavelengths of the VUV light; and (e) detecting the at least one analyte within the flow of liquid based on the absorbance of the at least one analyte at the one or more wavelengths of the VUV light, wherein the photolysis enhances detection of the at least one analyte.

The photolysis induced in step (b) enhances detection of the at least one analyte in step (d). In some embodiments, the photolysis may enhance detection of the at least one analyte by modifying the at least one analyte. In other embodiments, the photolysis may enhance detection of the at least one analyte by modifying the mobile phase solvent. In yet other embodiments, the photolysis may enhance detection of the at least one analyte in light of a second analyte included within the flow of liquid.

In some embodiments, the photolysis induced within the flow of liquid in step (b) may be controlled to adjust an extent to which the photolysis enhances detection of the at least one analyte. In some embodiments, the photolysis induced within the flow of liquid may be controlled by adjusting a power output of a light source coupled to provide the VUV light. In other embodiments, the photolysis induced within the flow of liquid may be controlled by adjusting a spectral output of the light source coupled to provide the VUV light. In other embodiments, the photolysis induced within the flow of liquid may be controlled by adjusting a flow rate of the flow of liquid passing through the flow cell.

Various embodiments of flow cells, VUV spectroscopy systems and methods are provided herein for analyzing liquids at VUV wavelengths. Of course, the order of discussion of the different steps as described herein has been presented for the sake of clarity. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section does not specify every embodiment and/or incrementally novel aspect of the present disclosure or claimed inventions. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

Figure 1:
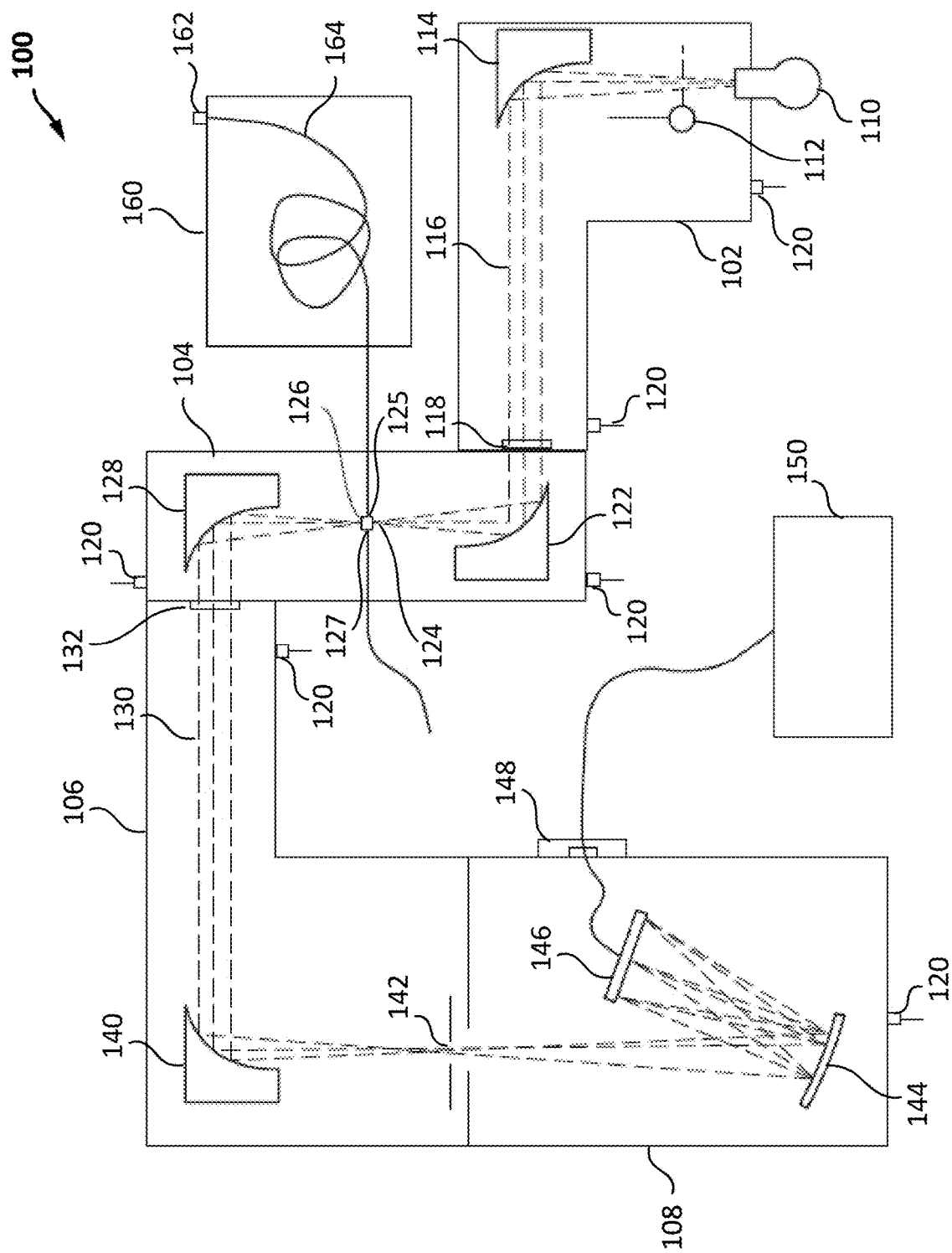
FIG. 1 is a schematic diagram illustrating one embodiment of a vacuum ultraviolet (VUV) detector comprising an ultra-short pathlength flow cell for use in conjunction with a liquid chromatography (LC) system.

The present disclosure provides a vacuum ultraviolet (VUV) spectroscopy system that is particularly well suited to the investigation of liquids. More specifically, the present disclosure provides a VUV detector for use with a liquid chromatography (LC) system (otherwise referred to herein as an LC-VUV detector) for the study of liquids.

In liquid chromatography, a sample is transported with a liquid solvent (referred to as the mobile phase) along a column. The column consists of a stationary phase that interacts with the various components of the sample. The interaction of the sample components with the stationary phase causes them to elute from the end of the column at different times, with the result that the sample is "separated" into its constituent components. Eluted components are detected by means of a detector. Modern day LC systems utilize very small particles in the stationary phase and relatively high pressures, and thus, are referred to as high performance liquid chromatography (HPLC) systems. Ultra performance liquid chromatography (UPLC) systems employ even smaller particles and operate at higher pressures.

The most common LC detector is the UV (ultraviolet) absorption detector. While widely employed due to their versatility and sensitivity, UV absorption detectors are unable to detect non-chromophoric molecules. In principle, an absorption detector extending into the VUV spectral range (100-200 nm) would greatly benefit the study of liquids, as it could to detect all molecules and provide greater detection sensitivity, owing to the higher absorption cross-sections exhibited by most molecules in the VUV spectral range. Unfortunately, the potential benefits of this approach have proved to be unattainable using standard bench-top systems since the higher cross-sections render macroscopic thicknesses of all liquids virtually opaque in the VUV spectral range. As a result, VUV absorption investigations of liquids have been almost entirely limited to systems coupled to dedicated VUV beam lines at massive synchrotron radiation facilities where incredibly intense light sources are available.

The present disclosure overcomes the limitations of conventional absorption detectors by providing an optically efficient bench-top VUV absorption detector for use with LC and UPLC systems (otherwise referred to herein as an LC-VUV detector). Unlike conventional absorption detectors, the LC-VUV detector described herein incorporates an ultra-short pathlength flow cell into the LC-VUV detector to render liquid samples at least semi-transparent to VUV light. As described in more detail below, the ultra-short pathlength flow cell is designed to: (a) interface with a focused light beam, (b) provide zero 'dead' volume, resulting in perfectly laminar flow through the flow cell, and (c) be modular and removable, allowing flow cells of different pathlength to be used within the LC-VUV detector. Additional advantages of the ultra-short pathlength flow cell are discussed in more detail below.

A schematic representation of a LC-VUV detector 100 in accordance with one embodiment of the present disclosure is presented in FIG. 1. As shown in FIG. 1, the LC-VUV detector 100 generally includes a source module 102, a flow cell chamber 104 and a detector module 106 coupled to a spectrometer 108. The source module 102 includes a VUV light source 110, a computer-controlled shutter mechanism 112 and a VUV optic 114. In operation, VUV light from the VUV light source 110 is blocked or allowed to pass by the computer-controlled shutter mechanism 112 and collimated by the VUV optic 114, which directs the collimated beam 116 to the flow cell chamber 104. The shutter actuator (not shown) may be located external to the source module 102 and connected via a vacuum feed-through in an effort to minimize contamination sources in the optical path of the instrument.

While not explicitly shown in FIG. 1, it is noted that the source module 102 could be equipped with appropriate beam reducing VUV optics to shrink the diameter of the beam (relative to that of the flow channel) in order to increase the photon flux passing through the flow cell 126 provided within the flow cell chamber 104. In addition, the source module 102 could also be equipped with a photodetector (not shown) that could be used to monitor the output of the VUV light source 110 as a function of time. Such a photodetector may also prove useful in distinguishing changes in source output from those caused by contamination downstream in the optical system.

The VUV light source 110 preferably generates a broad band spectral output of VUV light. For example, the VUV light source 110 may generate VUV light within a spectral range comprising 112-900 nm. A particularly well-suited VUV light source 110 is a deuterium lamp equipped with a VUV transparent window. Such windows are typically constructed of one of a host of fluoride compounds (such as, e.g., magnesium fluoride, $MgF_2$, lithium fluoride, LiF, etc.), though fused silica can also suffice when working at longer VUV wavelengths. The VUV light source 110 is typically mounted so as to permit an airtight seal with the source module 102. Although a broad band VUV light source is preferred, intense line sources may alternatively be used in specific applications.

The VUV optic 114 is a collimating optic, which collimates the VUV light emitted by the VUV light source 110 and directs the collimated beam 116 of VUV light to the flow cell chamber 104. In one embodiment, the VUV optic 114 is a replicated off-axis toroidal mirror finished with an aluminum/$MgF_2$ coating to enhance VUV reflectivity. The surface roughness of the VUV optic 114 is well controlled to minimize scattering losses. In select instances, lenses could be used in place of mirrors; however, such an option may result in absorption losses and chromatic aberrations.

The collimated beam 116 exiting the source module 102 passes through a first VUV transparent window 118 as it enters the flow cell chamber 104. The first VUV transparent window 118 provides a leak tight seal that separates the environment within the source module 102 from the environment within the flow cell chamber 104. The environment within the source module 102 is maintained via gas connections 120, which ensure the concentration of absorbing species (e.g., oxygen, water, etc.) is low enough so as to not appreciably absorb the VUV photon flux. This may be accomplished using vacuum and/or purge gas techniques using, for example, a largely non-absorbing gas like nitrogen, helium, hydrogen, etc. Gas connections 120 are similarly provided within the flow cell chamber 104 and detector module 106 for controlling the environments contained therein. While not represented in the figure, it is understood that the gas connections 120 may also incorporate valves, regulators, controllers and the like, as required to maintain a controlled environment. In some cases, the gas connections 120 may be used to introduce very low concentrations of certain species into the controlled environment to promote cleaning of optical surfaces and/or prevent the build-up of contaminants on such.

The flow cell chamber 104 houses the flow cell 126 and additional VUV optics. In the embodiment shown in FIG. 1, a first VUV optic 122 is included within the flow cell chamber 104 to focus the collimated beam 116 received from the source module 102 into a focused beam 124 of VUV light, which passes through an optical path of the flow cell 126 to a second VUV optic 128. The second VUV optic 128 included within the flow cell chamber 104 collimates the VUV light exiting the flow cell 126 back into a collimated beam 130, which exits the flow cell chamber 104 through a second VUV transparent window 132 as it enters the detector module 106. Like the first VUV transparent window 118, the second VUV transparent window 132 provides a leak tight seal, which separates the environments within the flow cell chamber 104 and the detector module 106. As noted above, the environment within the detector module 106 may be controlled via gas connections 120 to minimize the concentration of VUV absorbing species within the detector module 106.

Light passing through the second VUV transparent window 132 is directed to a focusing optic 140 in the detector module 106 onto an entrance aperture 142 of the spectrometer 108. The light passing through the entrance aperture 142 is collected, diffracted and focused by a grating 144 onto a detector 146, where it is processed by detector electronics 148 and recorded by a computer 150. In one embodiment, the grating 144 may be an aberration corrected flat field diffraction grating to simultaneously focus and diffract the collected light; thereby reducing the number of optical elements required and improving optical efficiency. The detector 146 may be generally capable of detecting light in the VUV spectral range (100-200 nm). In one embodiment, the detector 146 may be a wide dynamic range, highly sensitive, back-thinned CCD image sensor. In another embodiment, a specialized photodiode array may also be employed. As shown in FIG. 1, the detector electronics 148 may be housed outside of the detector module 106 and connected via an electrical feed-through to minimize contamination sources inside the instrument. While not explicitly shown in FIG. 1, the entire system (e.g., source, shutter, gas connections, detector, etc.) may be controlled by a software program running on a computer and/or embedded controller.

In the LC-VUV detector 100, a liquid chromatograph 160 is coupled to provide a liquid sample to the flow cell 126 housed within the flow cell chamber 104. The liquid sample is introduced into the liquid chromatograph 160 at an injector port 162 before entering the column 164. The column 164 consists of a stationary phase that interacts with the various components of the liquid sample. The interaction of the sample components with the stationary and mobile phases causes them to elute from the end of the column 164 at different times, with the result that the liquid sample is "separated" into its constituent components. The liquid stream and separated sample components (analytes) exiting the liquid chromatograph 160 enter the flow cell 126 at an inlet port 125, as it exits the column 164, and interacts with the focused beam 124 of VUV light. The liquid stream entering the flow cell 126 travels the length of the flow cell and exits unconsumed via the outlet port 127 at the other end of the flow cell. In some embodiments, the inlet and outlet ports may be equipped with standard LC fittings to minimize "dead volume" within the flow cell 126. While not explicitly shown in the figure, it is understood that the liquid chromatograph 160 schematically shown in FIG. 1 may be equipped with a host of other components like pumps, degassing units, heaters, coolers, solvent reservoirs, controllers and the like. For example, the liquid chromatograph 160 may be equipped with an oven to maintain an elevated temperature as the liquid sample interacts with the column 164 to minimize the retention time variability of the eluted species.

The focused beam 124 of VUV light entering the flow cell 126 passes through the liquid stream traveling along a flow channel of the flow cell 126. Eluted components absorb light from the focused beam 124 resulting in a change in transmission and a detectable signal. The detected signal (essentially the transmittance through the flow cell 126) is recorded as a function of time and is dependent on the identity and density of analytes present in the liquid stream. As set forth in more detail below, the flow cell 126 is preferably implemented as an ultra-short pathlength flow cell to render liquid samples at least semi-transparent to VUV light.

The geometry of the flow cell 126 plays an integral role in the signal detected by the LC-VUV detector 100. Explicitly, the intensity of light when a single type of analyte is in the cell is given by:

$$I(\lambda) = I_o(\lambda) e^{-\sigma(\lambda)\frac{LN}{V}} \quad \text{Eqn. 1}$$

where $I_o(\lambda)$ is the intensity of the light when no analyte is in the flow cell, σ is the absorption cross-section (per molecule) of the analyte, L is the flow cell length, N is the number of analyte molecules in the flow cell, and V is the flow cell volume. To enable the highest possible absorption response from a given analyte to be recorded, it is generally desirable to employ as long a path length as possible. Of course, as the mobile phase solvents will also absorb strongly in the VUV range it may be necessary to reduce the path length of the flow cell accordingly to ensure it remains sufficiently transparent. A flow cell design with variable pathlength is discussed further herein in reference to FIGS. 3-5.

In operation, the liquid stream exiting the column 164 travels through the flow channel and exits the flow cell 126 via the outlet port 127. The outlet port 127 can be connected to a liquid reservoir. The exiting liquid stream can also be introduced to another detector, as discussed further herein. While represented simply in the figures, the geometry of the flow cell 126 and the associated LC fittings may be specifically designed to reduce, or altogether remove, "dead volume" within the flow cell 126, thereby promoting laminar flow through the flow cell 126. Further insight into the nature of these features and other advantageous design elements are discussed in more detail below in reference to flow cell design shown in FIGS. 3-5.

Figure 2:
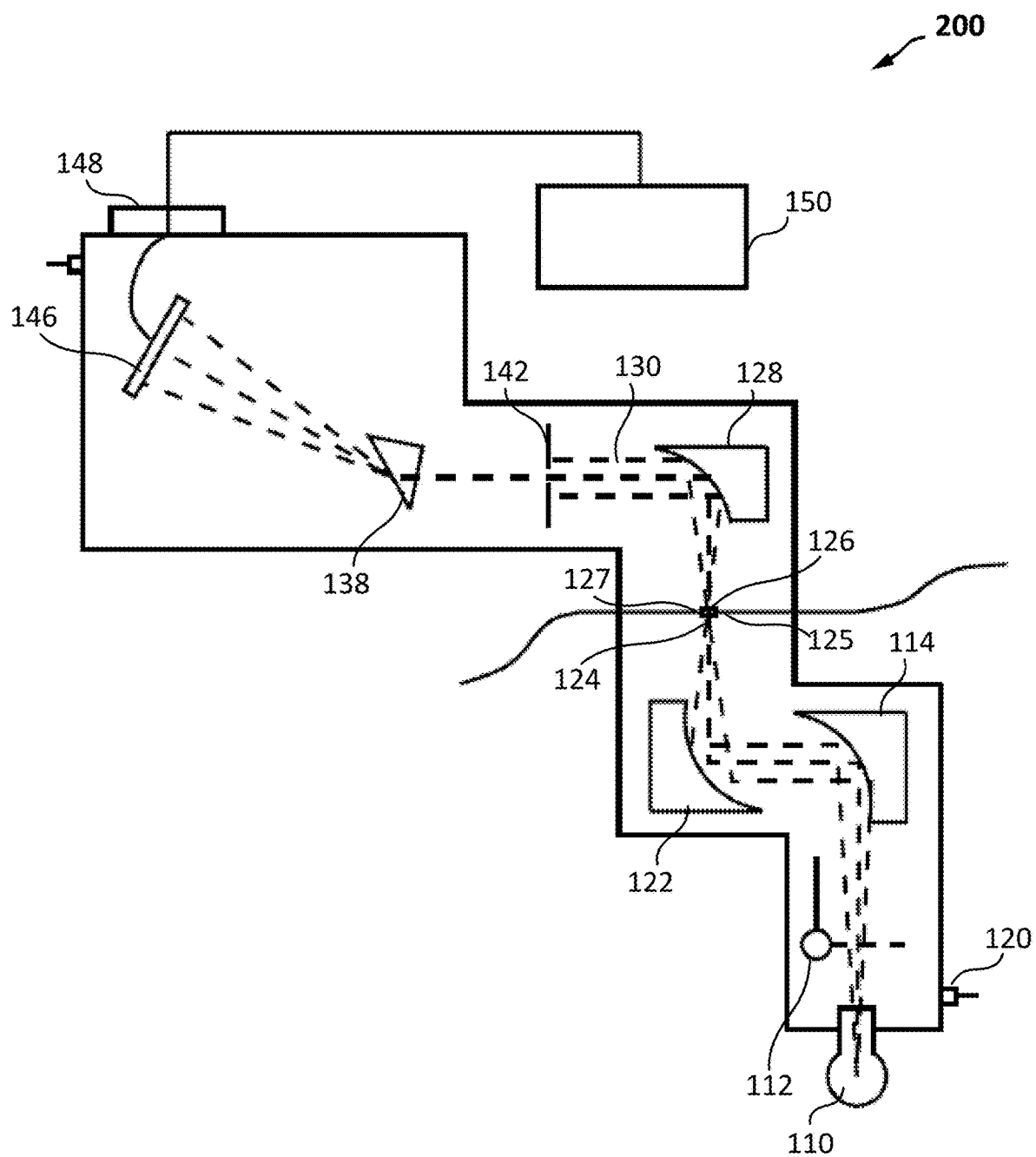
FIG. 2 is a schematic diagram illustrating another embodiment of a VUV detector comprising an ultra-short pathlength flow cell for use in conjunction with an LC system.

FIG. 2 illustrates another embodiment of an LC-VUV detector 200 incorporating a focused-beam ultra-short pathlength flow cell 126 and liquid chromatograph (not shown in FIG. 2). The LC-VUV detector 200 shown in FIG. 2 differs from the LC-VUV detector 100 shown in FIG. 1 by not containing the flow cell 126 within an isolated, controlled environment. Instead, the flow cell 126 shares its controlled environment with the source and detector modules, thus eliminating the need for VUV transparent windows separating these regions.

In the embodiment shown in FIG. 2, the collimated beam 130 reflected from the second VUV optic 128 passes through the entrance aperture 142 of the spectrometer 108 to a prism 138, instead of the diffraction grating 144 used in FIG. 1. The light dispersed by the prism 138 may result in greater resolution at shorter wavelengths, and lower resolution at longer wavelengths, than its grating-based counterpart. This difference may prove beneficial, in some instances, as the enhanced resolution at shorter wavelengths may provide greater insight into the spectral region where most liquids (analytes and solvents) exhibit the onset of absorption. Of course, there may be other instances where the grating solution is better suited, and thus, the grating 144 may be used in LC-VUV detector 200 instead of the prism 138 shown in FIG. 2. While not explicitly shown in FIG. 2, the LC-VUV detector 200 may also be equipped with the appropriate mating surfaces to interface with the seals on the flow cell 126 and ensure that a controlled environment is maintained within the optical path of the instrument. If deemed necessary, the LC-VUV detector 200 could also be equipped with the necessary components to set and maintain a fixed temperature during operation to minimize unwanted effects which may arise from thermal perturbations.

Figure 3:
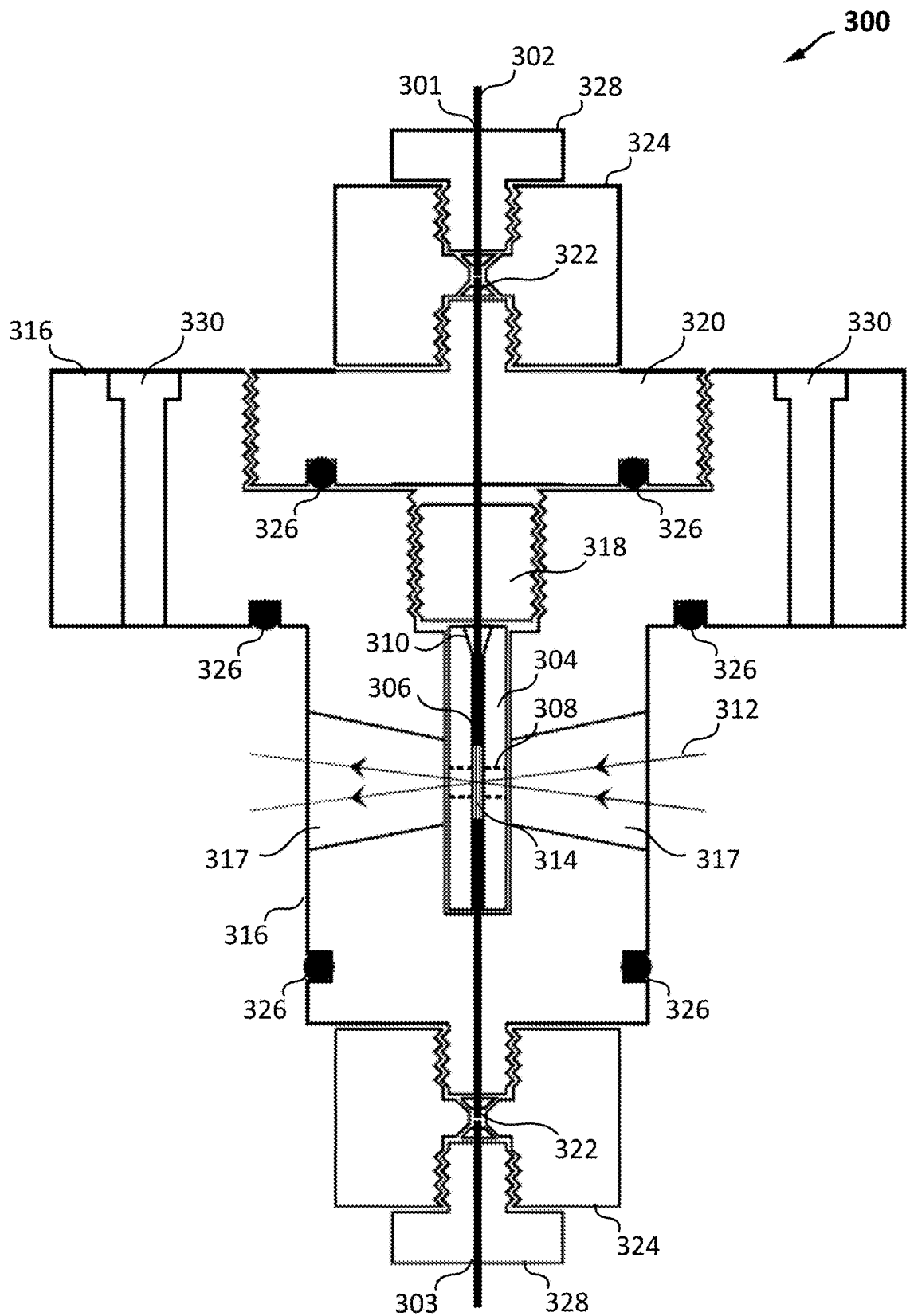
FIG. 3 is a schematic diagram illustrating a cross-sectional side view of an ultra-short pathlength flow cell in accordance with one embodiment the present disclosure.

FIG. 3 provides a simplified, cross-sectional side view of a flow cell 300 that can be used within an LC-VUV detector, such as the detectors shown schematically in FIGS. 1 and 2. The flow cell 300 shown in FIG. 3 is an ultra-short pathlength flow cell, which is designed to interface with a focused light beam and has zero 'dead' volume, resulting in perfectly laminar flow through the flow cell. The flow cell 300 is also modular and removable, which enables the flow cell 300 to be inserted within and removed from an LC-VUV detector. This modularity provides the advantage of allowing flow cells of different optical pathlength to be used within the LC-VUV detector.

Running through the center of the flow cell 300 is a sample tube 302. The sample tube 302 is a cylindrical tube, which is constructed of UV transmissive materials and coupled to receive a flow of liquid from a liquid chromatography (LC) system, such as the liquid chromatograph 160 shown schematically in FIG. 1. The sample tube 302, which is provided within the flow cell housing 316, may be constructed of a wide variety of optically transmissive materials. In one embodiment, the sample tube 302 may be formed of fused silica and coated with a protective coating (e.g., a polyimide film) to provide mechanical strength. However, other chemically inert, UV transmissive materials may also be used to form the sample tube 302, assuming they possess suitable optical properties in at least a portion of the VUV spectral range (100-200 nm).

During operation, the LC system provides a liquid stream (or flow of liquid) having separated sample components (analytes) to the flow cell 300. The liquid stream enters the sample tube 302 at an inlet port 301 arranged at one end of the flow cell 300 and travels the length of the flow cell 300 before exiting unconsumed at an outlet port 303 arranged at the opposite end of the flow cell 300. The cylindrical shape of the sample tube 302 promotes laminar flow of the liquid stream through the sample tube 302 by reducing or eliminating dead zones within the tube and the LC fittings 328, which are provided at either end of the flow cell 300 for interfacing with LC system components. The diameter of the sample tube 302 is extremely small (e.g., 25-530 µm) to minimize transmission losses through the absorbing mobile phase solvents. While alternate embodiments could employ non-cylindrical sample tube geometries, it is likely this could adversely affect temporal resolution.

A precision tube guide 304 is provided within the flow cell housing 316 to accurately position the sample tube 302 at a focal point of a focused beam 312 of VUV light, which is directed through detection area of the flow cell 300 by the VUV optics provided within the LC-VUV detector. Unlike the sample tube 302, the precision tube guide 304 is not constructed of UV transmissive materials. Instead, the precision tube guide 304 is constructed of a material, which blocks or prevents light from passing through a majority of the precision tube guide 304. In some embodiments, the precision tube guide 304 may be a cylindrical tube constructed of a metal such as, for example, stainless steel, aluminum or steel. The precision tube guide 304 could also be constructed from other materials including various ceramics, plastics (such as, e.g., polyetheretherketone, PEEK) or thermoplastic resins (such as, e.g., polyetherimide, ULTEM).

As shown in FIG. 3, the precision tube guide 304 comprises a first channel 306 that extends along the longitudinal axis of the precision tube guide 304 and a second channel 308 (denoted by the dashed lines) that extends in a direction perpendicular to the longitudinal axis of the precision tube guide 304. The sample tube 302 is inserted within the first channel 306 of the precision tube guide 304 to accurately position a cross-sectional area of the sample tube 302 in a plane perpendicular to the longitudinal axis of the precision tube guide 304. In some embodiments, insertion of the sample tube 302 through the top of the precision tube guide 304 may be aided by a self-aligning tapered region 310 at the opening of the first channel 306. In some embodiments, the inner diameter of the first channel 306 (e.g., 360-680 µm)

may be only slightly larger than the diameter of the sample tube 302 (e.g., 25-530 μm) to ensure that the sample tube 302 is accurately positioned within the center of the precision tube guide 304. This positioning ensures that the focused beam 312 of VUV light impinges only on the sample tube 302 and does not pass as stray light on either side of the tube.

The second channel 308 provides an optical path through the flow cell 300 that permits the focused beam 312 of VUV light to pass through the sample tube 302 positioned within the precision tube guide 304. The sample tube 302 is preferably positioned within the precision tube guide 304 at the focal point of the focused beam 312, as shown in FIG. 3. When the sample tube 302 is coated with a protective coating, such as polyimide, a small section of the polyimide may be removed from the sample tube 302 in the region 314 to enhance the transmission of VUV light through the sample tube 302. Alignment of the polyimide-free region 314 of the sample tube 302 with the center of the second channel 308 is straightforward as the polyimide-free region 314 can be arbitrarily taller than the height of the second channel 308.

Figure 4:
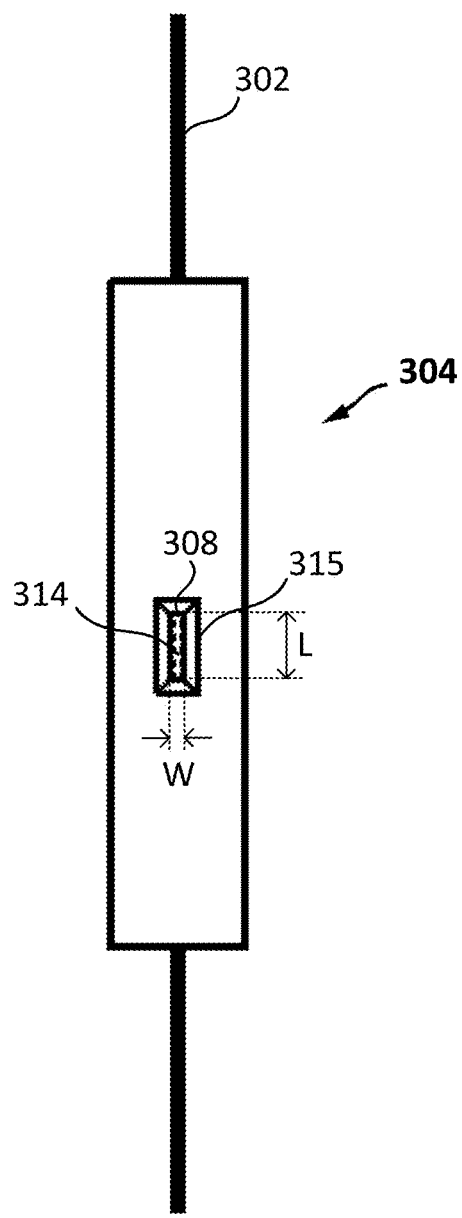
FIG. 4 is a front view of a precision tube guide included within the flow cell of FIG. 3.

A front view of the precision tube guide 304 is provided in FIG. 4. The polyimide coated sample tube 302 is evident at the top and bottom of the precision tube guide 304. As shown in FIG. 4, the second channel 308 comprises an opening or aperture 315 on one side of the precision tube guide 304 for receiving the focused beam 312 of VUV light from the VUV optics provided within the LC-VUV detector. The focused beam 312 of VUV light received by the aperture 315 passes through the sample tube 302 and the flow of liquid flowing there through. Although not shown in FIG. 4, a similar aperture is provided on the opposite side of the precision tube guide 304 to allow light passing through the second channel 308 and the sample tube 302 to exit the flow cell 300.

The focused beam 312 of VUV light passes through the sample tube 302 in a direction perpendicular to the direction of fluid flow through the sample tube 302. As such, the diameter of the sample tube 302 generally corresponds to the optical pathlength of the flow cell 300. Although not depicted in FIG. 3, the width (W) of the aperture 315 shown in FIG. 4 is smaller than a diameter of the sample tube 302 to ensure that the focused beam 312 of VUV light received by the aperture 315 passes through (and not around) the sample tube 302. In some embodiments, the width (W) of the aperture 315 may be smaller than an inner diameter of the sample tube 302 (e.g., ~125 μm, in one embodiment). In one example embodiment, the width of the aperture 315 may be less than approximately one-half of the inner diameter of the sample tube 302. In the embodiment shown in FIG. 4, the aperture 315 is tapered to increase the solid angle of light passing through the polyimide-free region 314 of the sample tube 302. The increase in solid angle results in higher optical throughput, favorably impacting the resultant signal-to-noise ratio (SNR).

In some embodiments, the flow cell 300 shown in FIGS. 3-4 may be assembled by inserting the precision tube guide 304 into the flow cell housing 316. Once the precision tube guide 304 is inserted, the second channel 308 of the precision tube guide 304 is rotationally aligned with tapered openings 317 provided on either side of the flow cell housing 316 (see, FIG. 3) to ensure that the focused beam 312 of VUV light passes through the second channel 308 unobstructed. The position of the precision tube guide 304 is then secured in place with a set screw 318 having a channel passing through its longitudinal axis. A tubing nut 320 is then screwed onto the flow cell housing 316. The sample tube 302 is inserted into the top of the tubing nut 320, through the set screw 318 and through the first channel 306 in the precision tube guide 304. A ferrule 322 is swaged to the sample tube 302 to ensure that the center of polyimide-free region 314 of the sample tube 302 aligns with the center of the second channel 308 of the precision tube guide 304, following which a union 324 is installed. The opposite end of the sample tube 302 is secured in a similar fashion using a second ferrule 322 and union 324. The ferrules 322 provided at opposite ends of the sample tube 302 provide seals for the liquid flow entering and exiting the flow cell 300, while also preventing outside air/gases from entering the detection area of the flow cell 300 and absorbing VUV photons.

The focused-beam ultra-short pathlength flow cell 300 shown in FIGS. 3 and 4 has more demanding alignment requirements than a flow cell designed for use with a collimated light beam but can provide unparalleled temporal resolution and support a superior SNR owing to its vastly higher optical throughput. The demanding alignment requirements are met, in part, by the various positioning elements (e.g., the precision tube guide 304, set screw 318, tubing nut 320, ferrules 322 and unions 324) coupled to the flow cell housing 316, which accurately position and secure the sample tube 302 within the center of the second channel 308 of the precision tube guide 304 (i.e., the optical path passing through the flow cell 300). Once inserted into an LC-VUV detector, additional alignment features and techniques can be used to accurately align the center of the sample tube 302 at the focal point of the focused beam 312 of VUV light.

The assembled flow cell 300 can be installed within an LC-VUV detector using simple alignment features and fasteners. In some embodiments, removable fasteners 332 (e.g., screws) may be inserted within openings 330 provided within the flow cell housing 316 to secure the flow cell 300 within a flow cell chamber 400 of an LC-VUV detector, as shown in FIGS. 6A-6B and 7A-7B. The unions 324 provided on either end of the flow cell 300 are designed to interface with commercial LC fittings 328. As shown in FIGS. 3, 5, 6A-6B and 7A-7B, a plurality of seals 326 (such as, e.g., O-rings) may be coupled to the flow cell housing 316 to ensure the detection area within the flow cell 300 and the environment within the LC-VUV detector are sealed from the ambient environment surrounding the detector. When the flow cell 300 is inserted within the LC-VUV detector, the seals 326 coupled to the flow cell housing 316 prevent outside air/gases from reaching the detection area of the flow cell 300 and absorbing VUV photons. Although the seals 326 are illustrated in FIGS. 3, 5, 6A-6B and 7A-7B as coupled to the flow cell housing 316, the lower two seals may alternatively be coupled to the detector housing (e.g., the chamber housing 402), in alternative embodiments.

Figure 5:
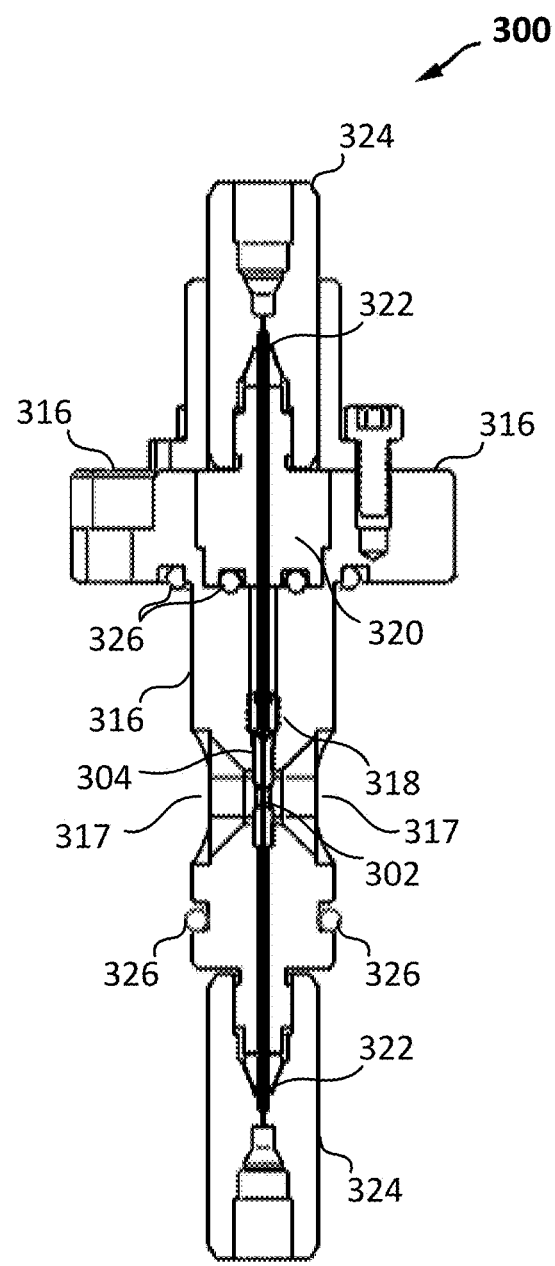
FIG. 5 is a cross-sectional view of a practical implementation of the ultra-short pathlength flow cell shown in FIG. 3.

FIG. 5 provides a cross-sectional view of a practical implementation of the flow cell 300 shown schematically in FIG. 3. The flow cell 300 shown in FIG. 5 includes the same flow cell components shown schematically in FIG. 3. For example, the flow cell 300 shown in FIG. 5 includes: (i) a sample tube 302 provided within a flow cell housing 316 to receive a flow of liquid from an LC system, (ii) a plurality of positioning elements (such as, e.g., the precision tube guide 304, set screw 318, tubing nut 320, ferrules 322 and unions 324) provided within the flow cell housing 316 to position and secure the sample tube 302 within the center of the second channel 308 of the precision tube guide 304, (iii) an aperture 315 (not shown in FIG. 5) to receive the focused beam 312 of VUV light and expose the flow of liquid passing through the sample tube 302 to the focused beam 312 of VUV light, and (iv) a plurality of seals 326 coupled to the flow cell housing 316 to seal the detection area within the flow cell 300, thereby preventing outside air/gases from reaching the detection area and absorbing VUV photons. The sample tube 302, positioning elements, aperture 315 and seals 326 may be generally configured as described above in reference to FIGS. 3-4. The flow cell 300 shown in FIG. 5 may also include additional components as discussed herein.

FIGS. 6A-6B and FIGS. 7A-7B provide perspective and front cross-sectional views of the flow cell 300 shown in FIG. 5 removed from (FIGS. 6A-6B) and installed within (FIGS. 7A-7B) a flow cell chamber 400 of an LC-VUV detector. In the embodiments shown in FIGS. 6A-6B and FIGS. 7A-7B, the flow cell chamber 400 includes a chamber housing 402, a flow cell port 404, a first VUV optic 408 and a second VUV optic 410. The flow cell port 404, which is configured to receive and position the flow cell 300 within the chamber housing 402, extends through the chamber housing 402 in a direction perpendicular to an optical path 406 extending between a first VUV optic 408 and a second VUV optic 410. Similar to the VUV optics 122 and 128 shown in FIG. 1, the first VUV optic 408 included within the flow cell chamber 400 focuses a collimated beam of VUV light received from a source module into a focused beam 312 of VUV light, which passes through the aperture 315 provided within the flow cell 300 to the second VUV optic 410. The second VUV optic 410 included within the flow cell chamber 400 collimates the light exiting the flow cell 300 into a collimated beam, which exits the flow cell chamber 400 and enters the detector module.

Figure 7A:
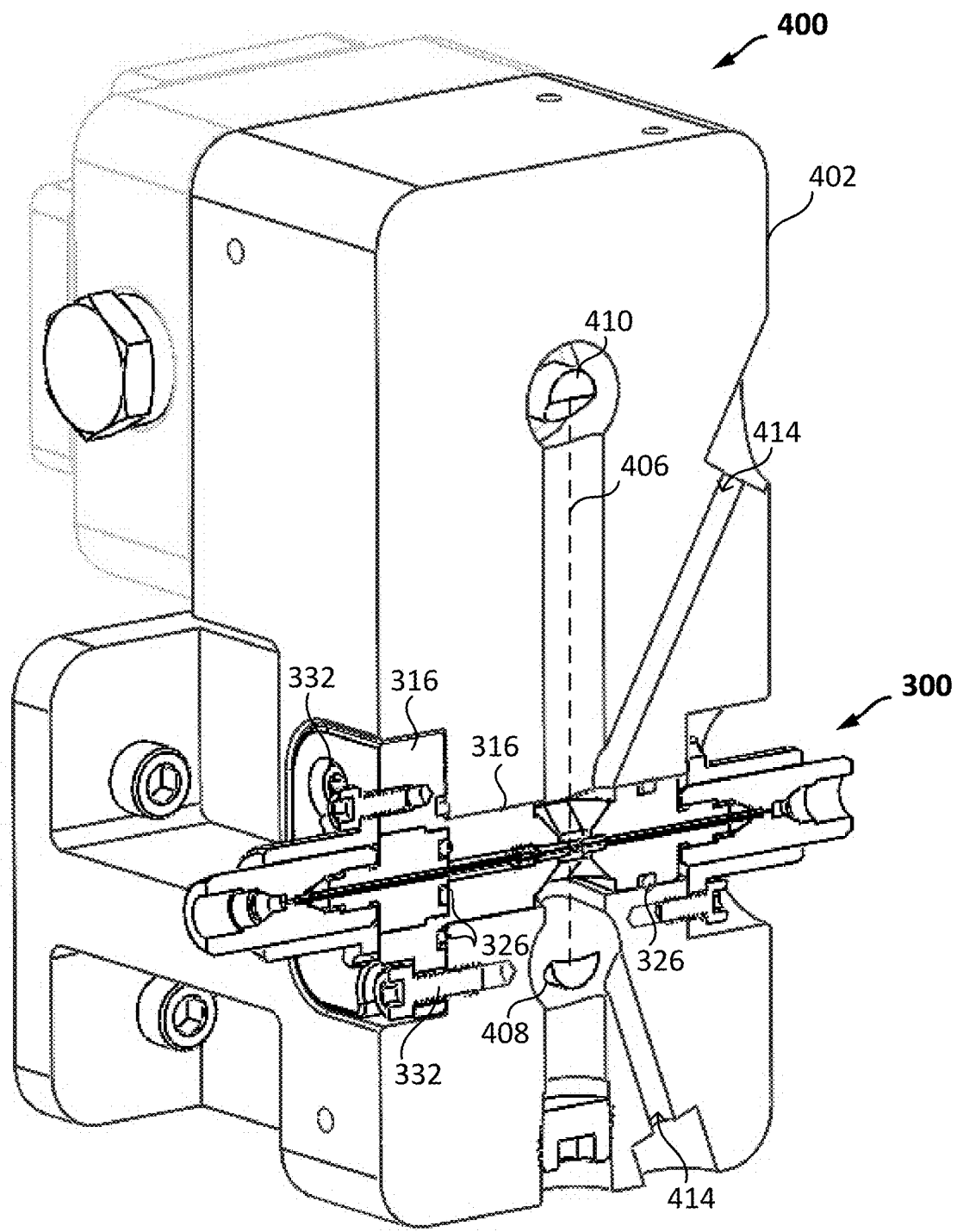
FIGS. 7A-7B are perspective cross-sectional views of a flow cell chamber, illustrating the flow cell of FIG. 5 inserted into the flow cell chamber.
Figure 7B:
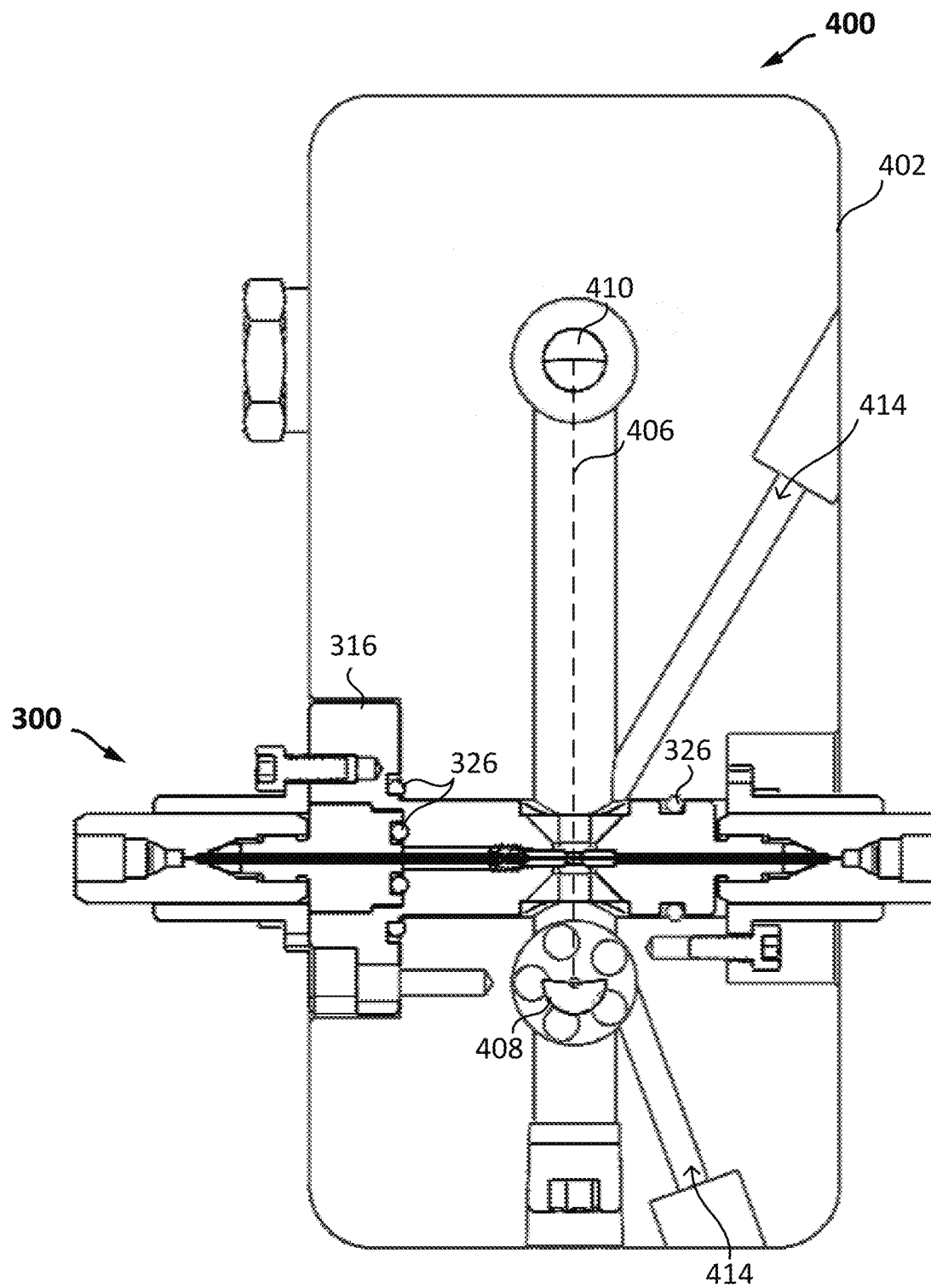

Alignment features are provided within the chamber housing 402 and/or on the flow cell 300 to provide gross alignment of the flow cell 300 within the flow cell chamber 400. First, the flow cell port 404 provides gross alignment of the flow cell 300 by providing a pre-configured insertion path that grossly aligns the aperture 315 of the precision tube guide 304 with the optical path 406 through the flow cell chamber 400. Alignment pin(s) (not shown) are provided on the flow cell housing 316. When the flow cell 300 is fully inserted into the flow cell port 404, as shown in FIGS. 7A-7B, the alignment pin(s) couple with hole(s) 412 provided within the flow cell port 404 to precisely align the flow cell 300 within the flow cell port 404. This ensures accurate alignment of the aperture 315 of the precision tube guide 304, and the center of the sample tube 302 contained therein, with the focal point of the focused beam 312 of VUV light.

Figure 6A:
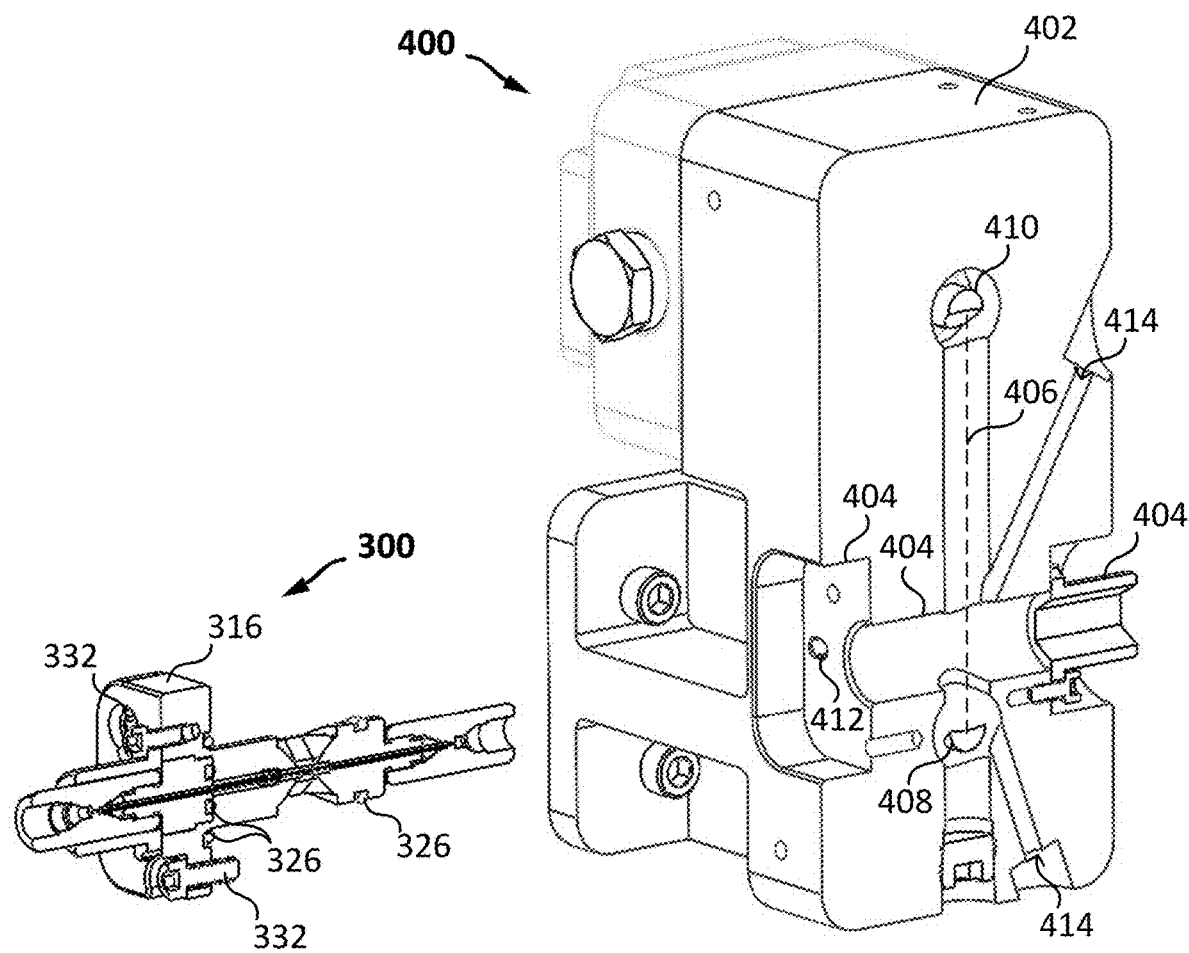
FIGS. 6A-6B are perspective cross-sectional views of a flow cell chamber, illustrating the flow cell of FIG. 5 removed from the flow cell chamber.
Figure 6B:
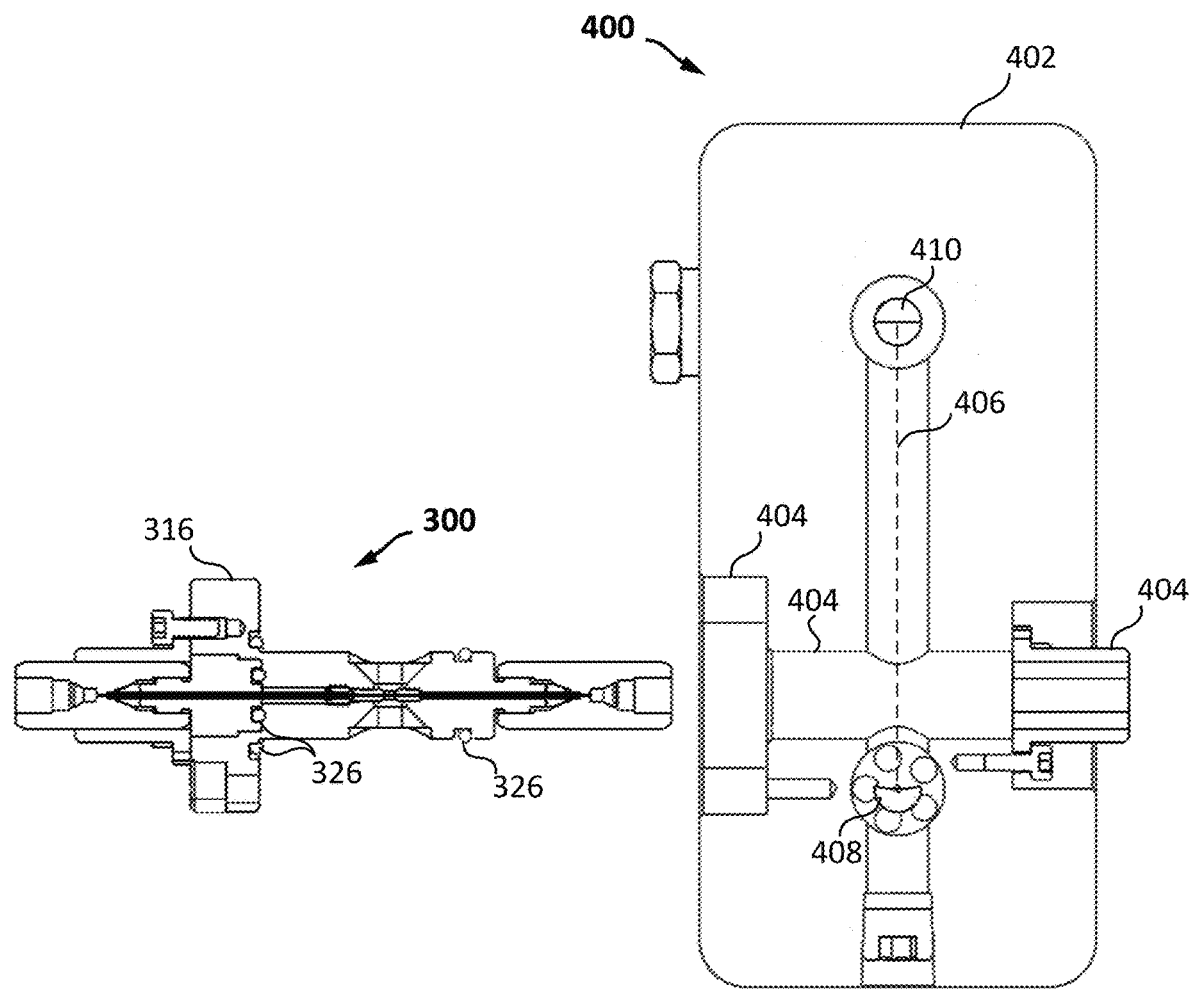

Additional alignment features and techniques can be used to aid in the alignment of the first VUV optic 408 and second VUV optic 410. As shown in FIGS. 6A, 7A and 7B, one or more optical alignment paths 414 are provided within the chamber housing 402 for aligning the focal point of the focused beam 312 passing through the optical path 406 with the aperture 315 provided within the precision tube guide 304. The optical alignment paths 414 provide a conduit through which the aperture 315 can be temporarily illuminated during an alignment process to align the optical path 406 extending between the first VUV optic 408 and the second VUV optic 410 with the optical path (e.g., the second channel 308) through the flow cell 300.

As shown in FIGS. 6A and 7A, removable fasteners 332 (e.g., screws) may be used to secure the flow cell 300 within the chamber housing 402 after the flow cell 300 is inserted into the flow cell chamber 400. In addition to securing the flow cell 300 within the chamber housing 402, the removable fasteners 332 may function as an additional alignment feature to ensure gross alignment of the flow cell 300 within flow cell chamber 400. In some embodiments, the removable fasteners 332 may be subsequently removed to remove the flow cell 300 from the flow cell chamber 400, possibly allowing a flow cell of different pathlength to be inserted into the chamber housing 402. Although a removable flow cell design is generally preferred, the flow cell 300 may be fixedly attached within the chamber housing 402 in alternative embodiments.

As noted above, the flow cell 300 includes a plurality of seals 326 to seal the detection area within the flow cell 300 and prevent outside air/gases from reaching the detection area and absorbing VUV photons. When the flow cell 300 is fully inserted within the flow cell port 404, as shown in FIGS. 7A-7B, the lower two seals 326 on the outside of the flow cell housing 316 contact the inner walls of the flow cell port 404 to hermetically seal the detection area of the flow cell 300 and the environment within the flow cell chamber 400 from the ambient environment surrounding the flow cell chamber. Although the lower two seals 326 are attached to the flow cell housing 316 in the embodiments shown in FIGS. 3, 5, 6A-6B and 7A-7B, the lower two seals 326 may be attached to the inner walls of the flow cell port 404, in alternative embodiments.

The flow cell 300 shown in FIGS. 3, 5, 6A-6B and 7A-7B can be utilized within a wide range of LC-VUV detectors such as, but not limited to, the LC-VUV detector 100 and the LC-VUV detector 200 shown schematically in FIGS. 1 and 2. Unlike conventional absorption detectors, the LC-VUV detectors shown in FIGS. 1 and 2 operate using a deuterium lamp equipped with a VUV transparent window and incorporate an ultra-short pathlength flow cell 300 into the LC-VUV detector to render liquid samples at least semi-transparent to VUV light.

As described above, the ultra-short pathlength flow cell 300 incorporated within the LC-VUV detector comprises an aperture 315 and optical path designed to interface with a focused beam 312 of VUV light, rather than a collimated light beam. This enables the ultra-short pathlength flow cell 300 to provide unparalleled temporal resolution and support a superior SNR owing to its vastly higher optical throughput. The sample tube 302 running through the flow cell 300 has an extremely small diameter (e.g., 25-530 µm), which minimizes transmission losses due to the absorbing mobile phase solvent flowing through the sample tube 302, which further increases the SNR of the detected signal. In addition, the cylindrical geometry of the sample tube 302 (and associated LC fittings 328) provide zero 'dead' volume within the flow cell 300, resulting in perfectly laminar flow through the flow cell 300.

In some embodiments, the ultra-short pathlength flow cell 300 may be modular and removable, allowing flow cells of different optical pathlength to be used within the LC-VUV detector. Flow cells having different optical pathlengths can be provided by changing the inner diameter of the sample tube 302 and associated size of the aperture 315 provided within the precision tube guide 304.

The modular design of the ultra-short pathlength flow cell 300 enables the flow cell 300 to be easily inserted within and removed from an LC-VUV detector. In some embodiments, the modular design of the flow cell 300 may enable the flow cell 300 to be inserted within/removed from a flow cell chamber 400 of an LC-VUV detector, as shown in FIGS. 6A-6B and 7A-7B and discussed above. As noted above, the alignment features provided on the flow cell chamber housing 402 and/or on the flow cell housing 316 (e.g., the flow cell port 404, alignment pins and holes 412) provide alignment of the flow cell 300 within the flow cell chamber 400 of the LC-VUV detector. These features optically align the flow cell chamber housing 402 with respect to the focal point of the focused beam 312 of VUV light, which is directed through the flow cell 300 by the VUV optics provided within the LC-VUV detector. The positioning elements (e.g., the precision tube guide 304, set screw 318, tubing nut 320, ferrules 322 and unions 324) coupled to the flow cell housing 316 ensure that the sample tube 302 running through the flow cell 300 is accurately positioned within the second channel 308 of the precision tube guide 304 such that light from the focused beam 312 of VUV light will pass through the sample tube and not around it. The seals 326 provided on the flow cell housing 316, or on the flow cell chamber housing 402, prevent air/gasses from entering the detection area within the flow cell 300 and the environment within the flow cell chamber 400 when the flow cell 300 is inserted within the LC-VUV detector.

An LC-VUV detector incorporating an ultra-short pathlength flow cell 300 as shown and described herein can be used to detect a wide variety of analytes within a liquid sample output from a liquid chromatography (LC) system. As noted above in reference to FIGS. 1-2, the LC-VUV detector may generally include a source module 102, a flow cell chamber 104 and a detector module 106 coupled to a spectrometer 108. In one embodiment, a VUV light source 110 and VUV optics may be utilized within the source module 102 to direct a focused beam 312 of VUV light through the aperture 315 and optical path provided within the flow cell 300. VUV light is generally considered to include wavelengths of light of about 200 nm and less. In one exemplary embodiment, the VUV light source 110 may be a broad-band VUV light source that exposes the analyte(s) in the liquid sample to multiple wavelengths of VUV light simultaneously. The spectrometer 108 provided within the LC-VUV detector analyzes the VUV light transmitted through the flow cell 300 to detect the analyte(s) within the liquid sample output from the LC system. In some embodiments, the spectroscopic results may be used to generate a chromatogram of the analyte(s) included within the liquid sample. Methods for generating a liquid chromatogram are disclosed in U.S. Pat. No. 10,641,749, which is entitled "Vacuum Ultraviolet Absorption Spectroscopy System and Method," filed May 16$^{th}$, 2019 and hereby incorporated herein in its entirety.

Figure 8:
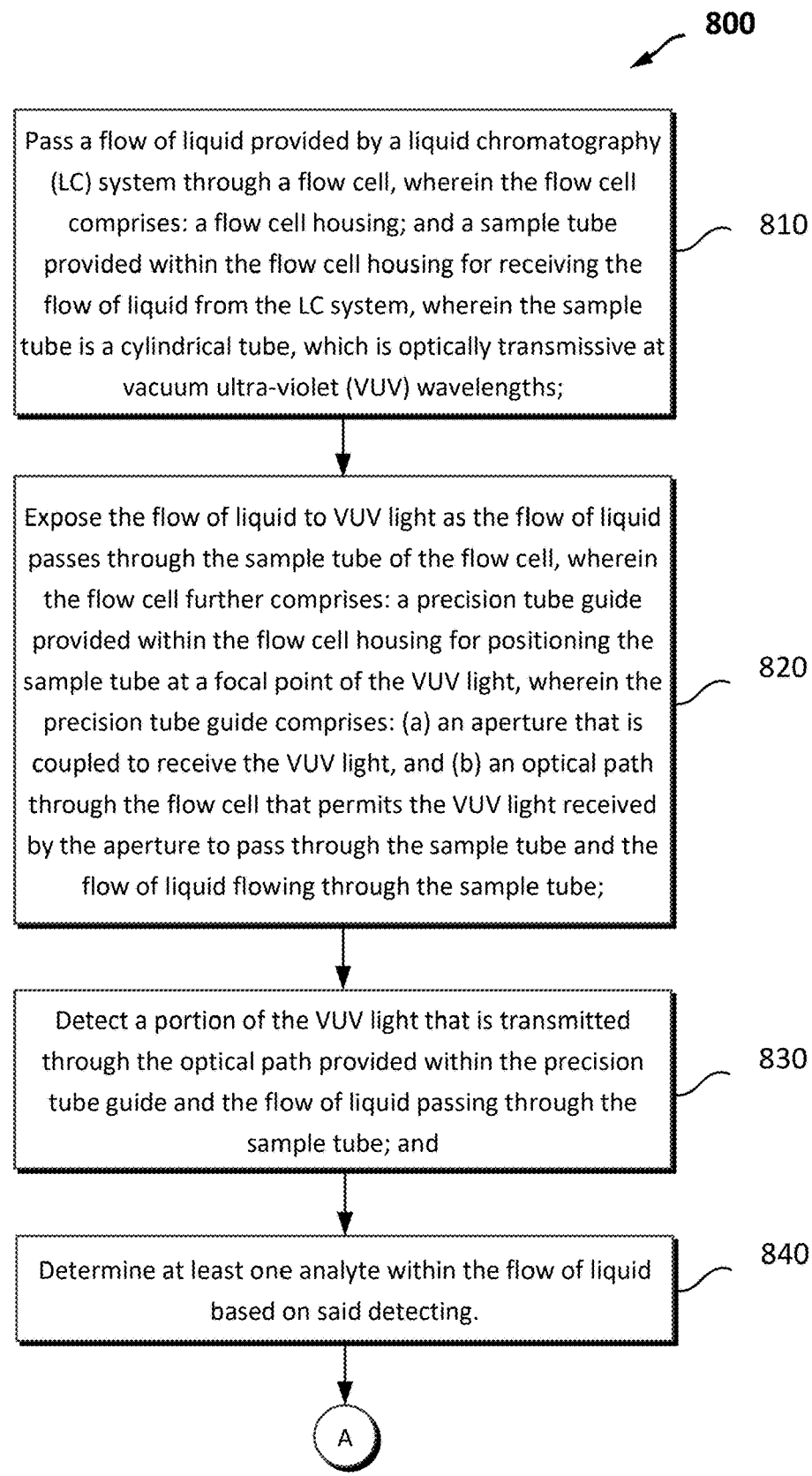
FIG. 8 is a flowchart diagram illustrating one embodiment of a method that utilizes the techniques disclosed herein to determine at least one analyte in a flow of liquid.
Figure 8:
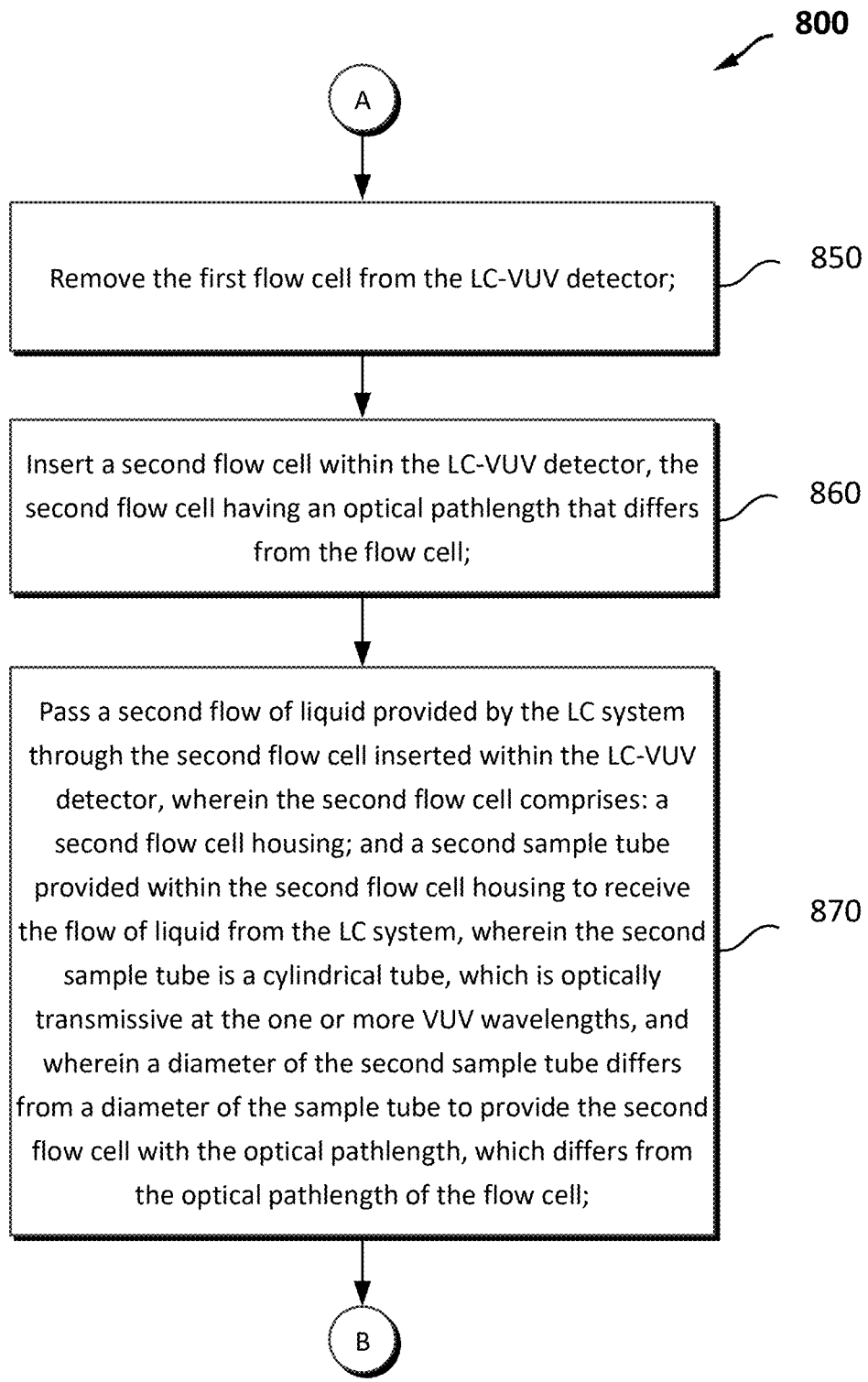
Figure 8:
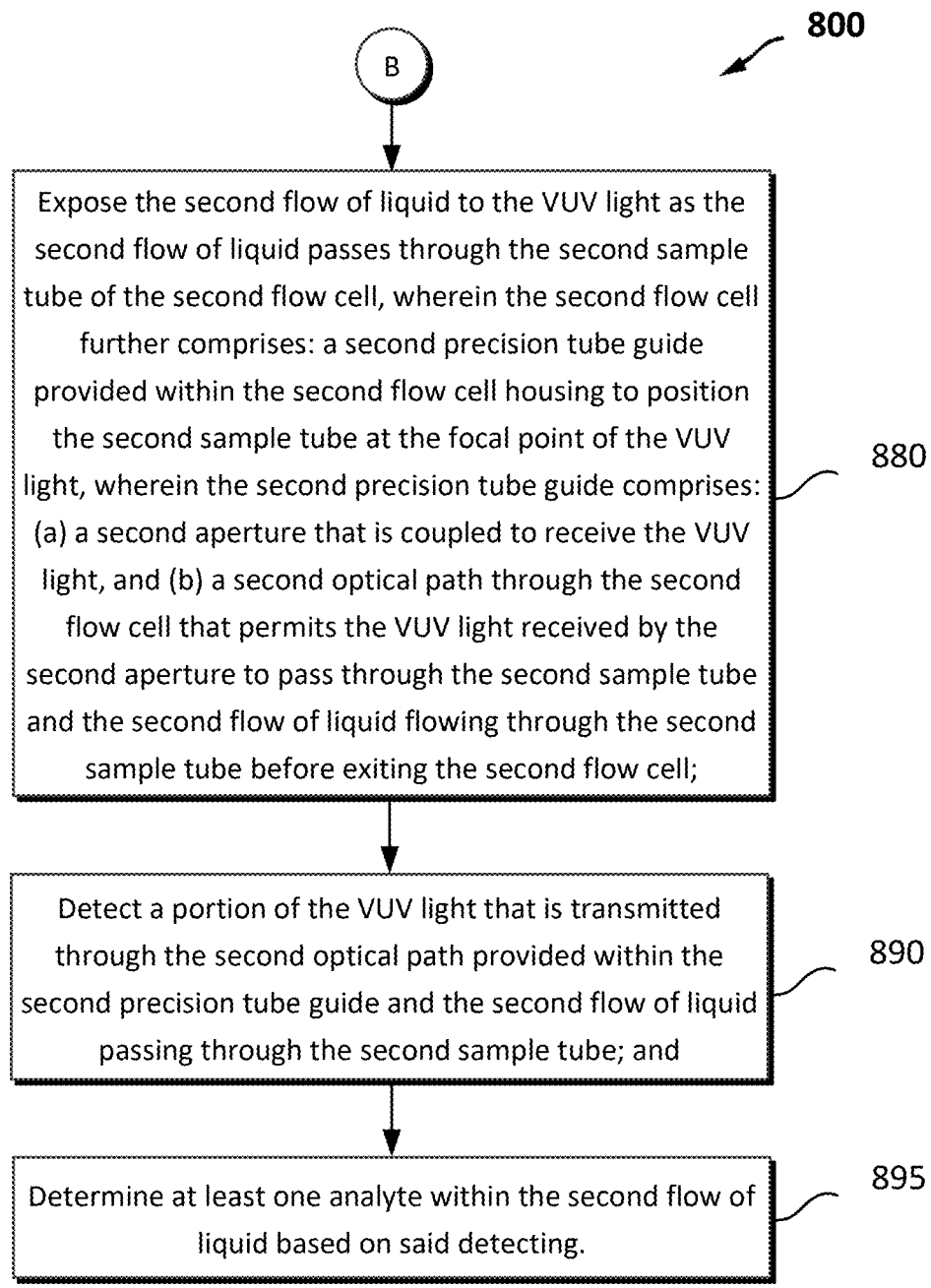

FIG. 8 illustrates one embodiment of a method 800 that may use the flow cell 300 shown and described herein to detect at least one analyte within a flow of liquid provided by a liquid chromatography (LC) system. It will be recognized that the embodiment shown in FIG. 8 is merely exemplary and additional methods may utilize the techniques described herein. Further, additional processing steps may be added to the method shown in the FIG. 8 as the steps described are not intended to be exclusive. Moreover, the order of the steps is not limited to the order shown in the figure as different orders may occur and/or various steps may be performed in combination or at the same time.

The method 800 shown in FIG. 8 begins passing a flow of liquid provided by a liquid chromatography (LC) system through a flow cell (in step 810). The flow cell used in step 810 may generally include a flow cell housing and a sample tube, which is provided within the flow cell housing for receiving the flow of liquid from the LC system. The sample tube is a cylindrical tube, which is optically transmissive at vacuum ultra-violet (VUV) wavelengths.

The method 800 further includes exposing the flow of liquid to VUV light as the flow of liquid passes through the sample tube of the flow cell (in step 820). The flow cell used in steps 810 and 820 further includes a precision tube guide, which is provided within the flow cell housing for positioning the sample tube at a focal point of the VUV light. The precision tube guide includes: (a) an aperture that is coupled to receive the VUV light, and (b) an optical path through the flow cell (e.g., the second channel 308) that permits the VUV light received by the aperture to pass through the sample tube and the flow of liquid flowing through the sample tube.

In some embodiments, the method 800 may expose the flow of liquid to VUV light (in step 820) by directing a focused beam of the VUV light to the aperture provided within the precision tube guide. In some embodiments, the width of the aperture may be smaller than a diameter of the sample tube to ensure that the focused beam of VUV light received by the aperture passes through the sample tube and not around the sample tube. In one exemplary embodiment, the width of the aperture may be less than one-half of the diameter of the sample tube. The diameter of the sample tube generally corresponds to an optical pathlength of the flow cell. In some embodiments, the diameter of the sample tube may range between 25 µm and 530 µm to provide a flow cell 300 with an ultra-short pathlength.

The method 800 further includes detecting a portion of the VUV light that is transmitted through the optical path provided within the precision tube guide and the flow of liquid passing through the sample tube (in step 830), and determining at least one analyte within the flow of liquid based on said detecting (in step 840).

In some embodiments, the method 800 may expose the flow of liquid to a wavelength (λ) of VUV light that is less than 200 nm (in step 820). In such embodiments, the method 800 may detect the portion of the VUV light that is transmitted through the optical path provided within the precision tube guide and the flow of liquid passing through the sample tube (in step 830) by detecting an intensity (I(λ)) of the portion of the VUV light that is transmitted through the flow of liquid at the wavelength (λ). The method 800 may then use the detected intensity (I(λ)) of the portion of the VUV light transmitted through the flow of liquid at the wavelength (λ) to calculate a transmittance (T(λ)) through the flow of liquid at the wavelength (λ) or an absorbance (A(λ)) of the at least one analyte at the wavelength (λ), and determine the at least one analyte within the flow of liquid based on the calculated transmittance (T(λ)) or absorbance (A(λ)) (in step 840).

One advantage of the flow cell described herein is that the flow cell is modular and removable, allowing flow cells of different optical pathlength to be used within the LC-VUV detector. In some cases, it may be desirable to use a flow cell having a different optical pathlength to: (a) detect different analytes within a liquid sample, (b) increase a detection sensitivity to an analyte in a liquid sample when a mobile phase solvent included within the liquid sample is significantly absorbing at the wavelengths used to detect the analyte, and/or (c) create conditions that are conducive to observing photolysis effects that may be induced within a liquid sample by the VUV light.

In some embodiments, the method 800 shown in FIG. 8 may further include removing the flow cell from the LC-VUV detector (in step 850), inserting a second flow cell within the LC-VUV detector, the second flow cell having an optical pathlength that differs from the flow cell (in step 860), passing a second flow of liquid provided by the LC system through the second flow cell inserted within the LC-VUV detector (in step 870), and exposing the second flow of liquid to the VUV light as the second flow of liquid passes through the second sample tube of the second flow cell (in step 880).

The second flow cell used in steps 860, 870 and 880 may generally include a second flow cell housing, a second sample tube provided within the second flow cell housing to receive the second flow of liquid from the LC system, and a second precision tube guide provided within the second flow cell housing to position the second sample tube at the focal point of the VUV light. Like the sample tube, the second sample tube is a cylindrical tube, which is optically transmissive at the one or more VUV wavelengths. However, a diameter of the second sample tube differs from a diameter of the sample tube to provide the second flow cell with the optical pathlength that differs from the optical pathlength of the flow cell. The second precision tube guide comprises: (a) a second aperture that is coupled to receive the VUV light, and (b) a second optical path through the second flow cell that permits the VUV light received by the second aperture to pass through the second sample tube and the second flow of liquid flowing through the second sample tube before exiting the second flow cell.

In some embodiments, the method 800 may further include detecting a portion of the VUV light that is transmitted through the second optical path provided within the second precision tube guide and the second flow of liquid flowing through the second sample tube (in step 890), and determining at least one analyte within the second flow of liquid based on said detecting (in step 895).

In some embodiments, the method 800 may expose the second flow of liquid to a wavelength (λ) of VUV light that is less than 200 nm (in step 880). In such embodiments, the method 800 may detect the portion of the VUV light that is transmitted through the second optical path provided within the second precision tube guide and the second flow of liquid passing through the second sample tube (in step 890) by detecting an intensity (I(λ)) of the portion of the VUV light that is transmitted through the second flow of liquid at the wavelength (λ). The method 800 may then use the detected intensity (I(λ)) of the portion of the VUV light transmitted through the second flow of liquid at the wavelength (λ) to calculate a transmittance (T(λ)) through the second flow of liquid at the wavelength (λ) or an absorbance (A(λ)) of the at least one analyte at the wavelength (λ), and determine the at least one analyte within the second flow of liquid based on the calculated transmittance (T(λ)) or absorbance (A(λ)) (in step 895).

For example, the transmittance (T(λ)) through the flow of liquid can be calculated (in step 840 and/or in step 895) as:

$$T(\lambda) = \frac{I(\lambda)}{I_o(\lambda)} \qquad \text{Eqn. 2}$$

where I(λ) is the intensity of the portion of the VUV light that is transmitted through the flow of liquid at the wavelength (λ), and $I_o(\lambda)$ is the intensity of VUV light detected when no analyte is in the flow cell 300. Similarly, the absorbance (A(λ)) of the at least one analyte at the wavelength (λ) can be calculated (in step 840 and/or in step 895) as:

$$A(\lambda) = \log\left(\frac{1}{T}\right) = \log\left(\frac{I_o(\lambda)}{I(\lambda)}\right) \qquad \text{Eqn. 3}$$

For a single analyte in a flow cell of pathlength L and volume V, the transmittance (T(λ)) in Eqn. 2 can be further expressed as:

$$T(\lambda) = e^{-\sigma(\lambda)\frac{N}{V}L} \qquad \text{Eqn. 4}$$

where N is the number of analyte molecules present in the flow cell, and σ(λ) is the wavelength-dependent absorption cross-section per molecule, which usually just referred to as "absorption cross-section" and expressed in units of area. In addition to being wavelength-dependent, the absorption cross-section is different for different analytes. As such, the wavelength-dependent absorption cross-section is the "fingerprint" that enables analytes to be detected using optical spectroscopy.

The absorbance of the analyte in Eqn. 3 can be alternatively expressed as:

$$A(\lambda) = \log_{10}\left(\frac{1}{T}\right) = \frac{1}{\ln(10)}\sigma(\lambda)\frac{N}{V}L. \qquad \text{Eqn. 5}$$

In the case where a single analyte of known cross-section is present in the flow cell, Eqn. 5 can be directly inverted to obtain the number (N) of analyte molecules in the flow cell:

$$N = \frac{V\ln(10)}{\sigma(\lambda)L}A(\lambda). \qquad \text{Eqn. 6}$$

In principle, only the absorbance and cross-section at one wavelength value is needed in order to determine N, although in practice data from multiple wavelengths can be used via a regression procedure, with the advantage of reduced uncertainty in the determination of N. Alternately, the inversion in Eqn. 6 can be performed for each measured wavelength value, and the N obtained verified for consistency. Different N obtained using data at different wavelengths implies an error in the measured data, or that the wavelength-dependence of the assumed cross-section is in error.

Typically, the molar mass, M, of the analyte is known, and this can be used to calculate the mass (m) of analyte in the flow cell via Eqn. 7:

$$m = \frac{M}{N_A}N, \qquad \text{Eqn. 7}$$

where N is the number of analyte molecules present in the flow cell and $N_A$ is Avogadro's constant. Therefore, with knowledge of the analyte cross-section and the flow cell geometry, a chromatogram can be converted to either the number (N) of analyte molecules or mass (m) of analyte in the flow cell as a function of time. Flow cell geometry can also be invoked in order to express the number density or mass density of analyte in the flow cell. A concentration can be computed by knowing the injected solvent volume (e.g., micrograms per milliliter of solvent).

For a case involving multiple analyte components in the flow cell at a given time, the absorbance (A(λ)) of the at least one analyte at the wavelength (λ) is given by:

$$A(\lambda) = \frac{L}{V \ln(10)} \sum_{i=1}^{n} \sigma_i(\lambda) N_i,  \quad \text{Eqn. 8}$$

where n is the total number of analyte components in the cell, $\sigma_i(\lambda)$ is the absorption cross-section of component analyte i, and $N_i$ is the number of molecules of component i. A situation like this may arise when a solution consisting of many analyte components is injected into the flow cell.

Solving Eqn. 8 for the unknown $N_i$ requires absorbance measurements at least n different wavelength values. In this case, Eqn. 8 is a system of n linear equations, which can be solved using techniques known in the art. In practice, Eqn. 8 is over-determined as there are many more data points than unknown quantities $N_i$. Such an equation can be reduced to a number of independent equations equaling the number of unknowns. Alternately, a regression fitting technique can be used. A regression technique is also advantageous in that it allows for uncertainty in the measured data, as well as in the assumed cross-sections. The result of the regression of Eqn. 8 is a set of best fit values for the $N_i$ as well as a confidence metric, often called a "Goodness Of Fit" (GOF). One such regression technique is the Levenberg-Marquardt method described in Press, et al. (W. H. Press, S. A. Teukolsky, W. T. Vetterling, and B. P. Flannery. *Numerical Recipes in C: The Art of Scientific Computing, Second Edition*. Cambridge University Press, 1992).

Thus, given a set of analyte components whose wavelength-dependent absorption cross-sections are known, a measurement of the wavelength-dependent absorbance spectrum can be used to determine the set of $N_i$ most consistent with the measured spectrum—i.e., the unknown amounts of each analyte component can be determined.

In a case where the cross-section values are not known, Eqn. 5 cannot be solved for all of the unknowns, since there is now an unknown cross-section for each measured data point, plus one additional unknown, N. More generally, it is desirable to store a database of cross-section values for various "known" substances that can be used as inputs to Eqns. 5, 6, and 8 when measuring amounts of various analytes. Furthermore, as the wavelength-dependent cross-section is essentially the identity of an analyte, it is advantageous to be able to search a set of absorbance data (e.g., from a VUV spectroscopic chromatogram) for the presence of a particular analyte. Accordingly, a method or methods for determining the cross-section spectrum when it is not already known is desirable.

In a first procedure, the absorbance is measured for a known amount of the analyte. A convenient way to accomplish this procedure is to combine a known quantity of analyte with a solvent, inject the mixture into an LC injection port, and measure the eluate with an LC-VUV detector. The LC separation ensures that the analyte component is measured by itself. Then, the cross-section can be determined at every wavelength for which there is absorbance data per Eqn. 9:

$$\sigma(\lambda) = \frac{V \ln(10)}{NL} A(\lambda). \quad \text{Eqn. 9}$$

This procedure need only be performed once for a given analyte. An unknown amount of the analyte can later be determined using the methods discussed above by making use of the now known cross-section, regardless of whether the analyte is measured alone or together with other analyte components whose cross-sections are also known.

As noted above, it may be desirable to change the optical pathlength of the flow cell for a variety of reasons. For example, when the analyte and the mobile phase solvent included within the flow of liquid are both absorbing at the wavelength of the VUV light, the method 800 may further include selecting the optical pathlength of the second flow cell to improve detection of the analyte at the wavelength of the VUV light. When the analyte included within the second flow of liquid differs from the analyte included within the first flow of liquid, the method 800 may further include selecting the optical pathlength of the second flow cell to enable determination of the analyte within the second flow of liquid. When the second flow of liquid is exposed to VUV light to induce photolysis within the second flow of liquid, the method 800 may further include selecting the optical pathlength of the second flow cell to create conditions conducive to observing the photolysis within the second flow of liquid. The optical pathlength of the flow cell may also be changed for other reasons not specifically mentioned herein.

The present disclosure provides a novel absorption detector, flow cell design and methods for the study of liquids in liquid chromatography (LC) applications. In particular, the present disclosure provides a spectroscopy detector for LC applications that utilize vacuum ultra-violet (VUV) wavelengths to determine the analyte(s) present in a liquid sample. Most materials exhibit much stronger and richer absorption characteristics at VUV wavelengths than at, e.g., ultra-violet (UV) and visible wavelengths. Thus, a spectroscopy detector that utilizes VUV wavelengths provides enhanced sensitivity to analytes separated during the LC process. Utilizing a spectroscopy detector and VUV wavelengths for LC applications yields a three-dimensional dataset that enables both quantitative and qualitative capabilities. This three-dimensional dataset may include absorption data, wavelength data and time data. The data can be fit to determine amounts of eluting analytes, compared with known analyte spectra to identify eluting components, or fit against a model consisting of multiple analytes to determine amounts of coeluting species. Two-dimensional responses can be generated by applying spectral filters that integrate absorbance/transmittance data over specific wavelength regions, enhancing chromatogram responses to particular classes of analytes.

The spectroscopy detector and flow cell design described herein can support a wide range of methods of analyzing liquid materials. These methods may include, but are not limited to: (i) methods that utilize the optical contrast between the analyte(s) and mobile phase within a liquid sample to enhance detector sensitivity, (ii) methods that utilize UV photolysis of a liquid sample to enhance detector sensitivity, and (iii) methods that combine two or more detectors to analyze a liquid sample. These methods may be utilized independently or in various combinations and the disclosure provided herein is not meant to be limited to any particular analysis method.

Optical Contrast Between Analyte and Mobile Phase to Enhance Detector Sensitivity With traditional LC-UV detection, optical pathlength selection is driven by a variety of factors including, but not limited to, required sensitivity, sample dispersion (peak shape), sample conservation, spectral interference, and detector linearity. As UV transparency is one of the fundamental criteria for mobile phase selection in LC-UV analysis, an increase in optical pathlength typically results in greater analyte response without significantly impacting optical throughput or working spectral range. With LC-VUV detection, the situation is inherently more complicated as measurements are often carried out in regions where the mobile phase solvent is strongly absorbing. As a result, LC-VUV pathlength selection requires consideration of the optical properties of both the mobile phase solvent and the analytes of interest in the working spectral range.

As LC-VUV measurements will typically be conducted in spectral regions where the mobile phase solvent is absorbing, peak identification and quantitation will often involve non-zero baseline contributions from the mobile phase solvent. With LC methods incorporating mobile phase gradients, these background contributions will often change appreciably during peak elution. As a result, peak quantitation will regularly require mathematical corrections to remove baseline disturbances in the recorded chromatograms. There are many approaches known to one skilled in the art for addressing such issues including, but not limited to, blank subtraction, polynomial, spline and Savitzky-Golay filtering, iterative, statistical, and machine-learning methods.

The absorbance characteristics of the mobile phase solvent are important not only as they pertain to optical throughput and how they might affect the working spectral range, but also from the perspective of optical contrast (i.e., the difference between the optical properties of the mobile phase solvent and the analytes of interest) which ultimately determines sensitivity. The notion of optical contrast is not relevant in the context of LC-UV measurements, since the mobile phase solvent is intentionally selected to be UV transparent. It follows that the maximum optical contrast for a given analyte typically coincides with its absorbance maximum, regardless of the mobile phase solvent employed. However, the situation is more involved in LC-VUV measurements.

In the VUV spectral range, the analyte response is not solely dependent on the absorbance of the analyte itself, but rather on the difference between the absorbances of the analyte and the mobile phase solvent (otherwise referred to herein as the absorbance contrast). If, in a given wavelength region, the analyte and mobile phase solvent have the same absorbance cross-section, the analyte is essentially invisible. If the cross-section of the analyte is higher than that of the mobile phase solvent, its response will be positive; if it is lower, the response will be negative. Hence, the absorbance contrast between an analyte and its associated mobile phase solvent must be thoroughly considered to establish the optimum wavelength region to monitor if one is to achieve the highest possible detection sensitivity.

Figure 9:
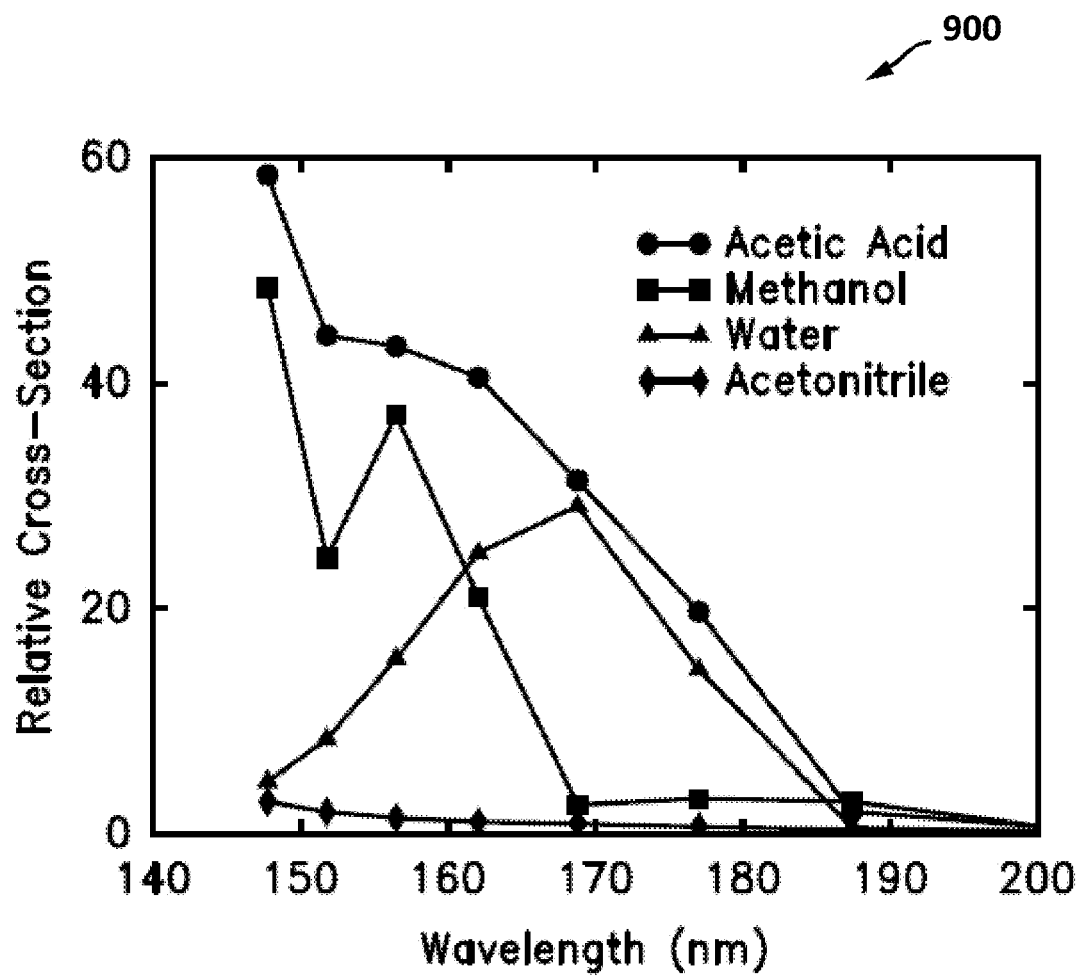
FIG. 9 is a graph illustrating relative absorbance cross-sections for acetic acid and three mobile phase candidates (methanol, water, and acetonitrile).

To highlight the importance of evaluating the absorbance contrast between analyte and mobile phase solvent when working in the VUV spectral range, the graph 900 shown in FIG. 9 depicts the relative absorbance cross-section detected at various wavelengths for acetic acid and three mobile phase candidates (methanol, water, and acetonitrile). As evident in the graph 900, absorbance cross-sections can vary significantly in the VUV spectral range. While the absorbance cross-section for acetic acid increases steadily and significantly upon onset as the wavelength is reduced, the three mobile phase candidates all behave quite differently. The greater the difference between the acetic acid and mobile phase cross-sections at a given wavelength, the greater the absorbance contrast response will be. Hence, from an absorbance contrast perspective, acetonitrile would be a favorable mobile phase solvent to use for the measurement of acetic acid, since the cross-section differences are relatively large across most of the spectral region shown. If, for reasons other than absorbance contrast, it was necessary to use water and/or methanol for the mobile phase solvent, care must be taken to ensure that the wavelengths providing the greatest absorbance contrast are considered.

Figure 10:
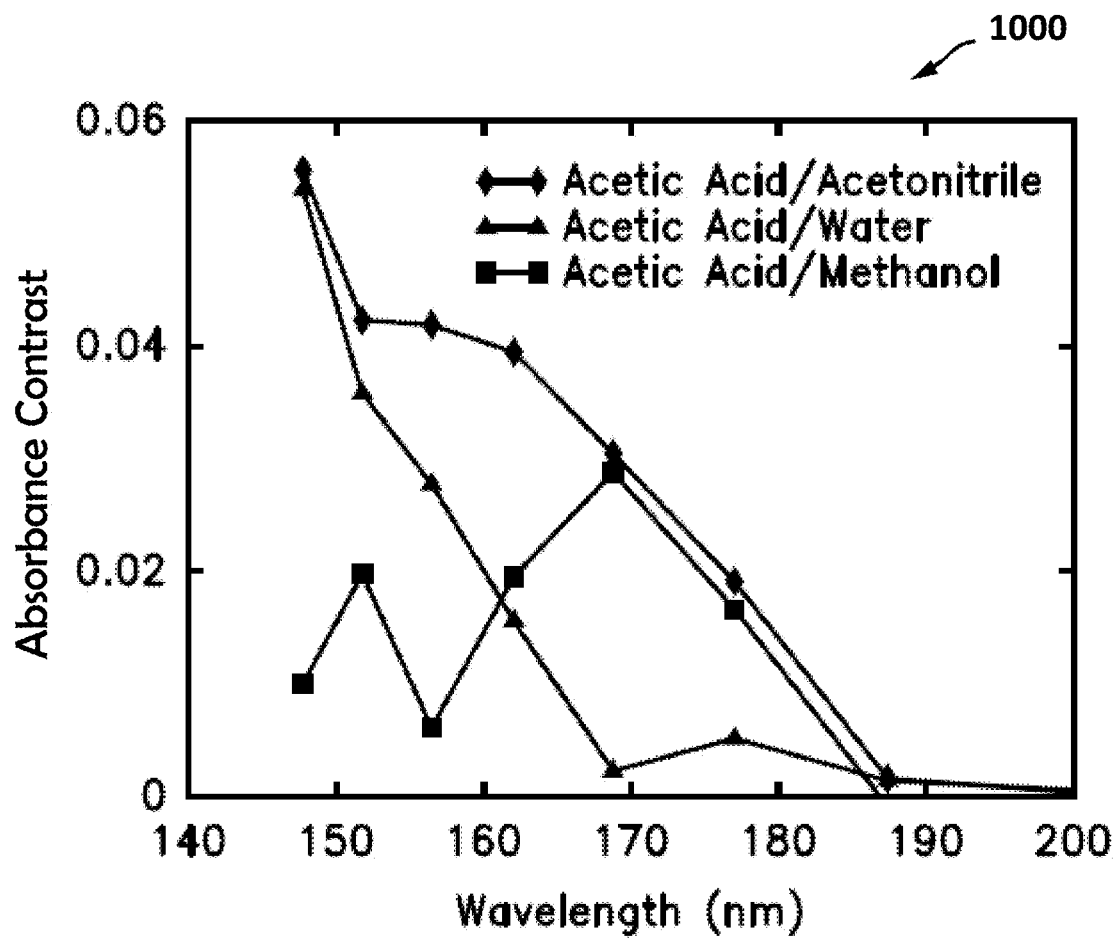
FIG. 10 is a graph illustrating absorbance contrast spectra for acetic acid in methanol, water, and acetonitrile.

The graph 1000 shown in FIG. 10 depicts the absorbance contrast spectra for acetic acid in each of the mobile phase candidates. As expected, acetonitrile provides not only the highest contrast of the three options, but also produces an absorbance contrast spectrum that appears similar to the absorbance cross-section of acetic acid, itself. This follows as the cross-section for acetonitrile is relatively weak, flat and featureless over the wavelength range considered. Water provides very little absorbance contrast for wavelengths>170 nm, since its cross-section is very similar to that of acetic acid in this range. As water becomes less absorbing at wavelengths<170 nm, the absorbance contrast with acetic acid increases steadily until nearly rivaling that of acetonitrile by ~150 nm. Conversely, methanol provides maximum absorbance contrast at ~170 nm and lower absorbance contrast values at shorter wavelengths.

While the absorbance contrast spectra for acetic acid all exhibit positive values in the graph 1000 shown in FIG. 10, it follows that a different combination of analyte and mobile phase constituents could produce all negative values, or a combination of positive and negative values depending on the cross-sections of the analyte and mobile phase solvent under study. These differences could be exploited to enhance the sensitivity of the LC-VUV detector to a given analyte. The response generated by a strongly absorbing analyte could be increased using a weakly absorbing mobile phase solvent. Solvents like water, acetonitrile, saturated hydrocarbons and polycyclic fluoroalkanes are a few examples of compounds that may be well-suited in this regard. Highly purified and degassed versions of these and other compounds may prove particularly effective. Degassing of solvents will be beneficial when working at VUV wavelengths as dissolved gases can significantly increase absorption, limiting optical throughput and spectral operating range. In some instances, it may be beneficial to degas samples as well to avoid unnecessary baseline artifacts and ensure accurate quantitation is achieved.

For weakly absorbing analytes, greater responses can be achieved using strongly absorbing mobile phase solvent(s), even though the responses themselves would produce negative values. In this manner, even compounds which themselves do not absorb appreciably in the spectral region of interest, could be detected by exploiting the reduction in overall absorbance that would be recorded by the LC-VUV detector as they pass through the detection volume of the flow cell with the strongly absorbing mobile phase. The addition of buffers and/or additives to the mobile phase solvent(s) can also affect the absorbance properties of the mobile phase, and as such, can be specifically tailored to enhance the response of a given analyte.

In situations where a target analyte exhibited little to no absorbance contrast with the mobile phase, detector response can be enhanced using an internal standard known to coelute with the analyte of interest. If said internal standard exhibited a large absorbance contrast with the target analyte, said target could be measured through comparison with measurements performed on the internal standard itself.

It follows that there would be considerable value in providing a means by which the VUV absorbance contrast of analytes in solvents or mixtures of solvents could be predicted. In this manner, solvents can be ranked according to the level of absorbance contrast they provided for a given analyte and this information can be used in conjunction with other considerations during LC-VUV method development. Such a capability can be achieved with a priori knowledge of the absorbance cross-sections of the solvent and analyte components. In most cases, the cross-sections for the solvents can be determined through direct measurement, while those of the analytes can be extracted from measurements made of the analytes in solution. This capability would be particularly useful when working with LC-VUV, since little to no information is available regarding the absorption properties of non-GC amenable compounds.

As all mobile phases are strongly absorbing in the VUV spectral range, it follows that a trade-off may exist between optical pathlength and optical throughput, and that this trade-off may directly impact detector performance. As such, the relationship between these variables should be evaluated during method development to ensure the detector is optimally configured for a given application. To do so, the SNRs for spectral regions exhibiting the highest absorbance contrast should be compared to determine the optical pathlength required for greatest sensitivity. If the absorbance contrast is highest in a region where the mobile phase is sufficiently transparent, it may prove advantageous to increase the optical pathlength of the flow cell, thus increasing the response of the analyte. This would be analogous to the typical UV detection case. Alternatively, if the absorbance contrast is highest in a region where the mobile phase is considerably more absorbing, better results can be obtained by decreasing the optical pathlength of the flow cell, thus increasing the optical throughput. As noted above, the flow cell 300 shown in FIGS. 3, 5A-5B and 6A-6B provides a modular, removable design, which allows flow cells of different optical pathlength to be used within the LC-VUV detector.

Figure 11:
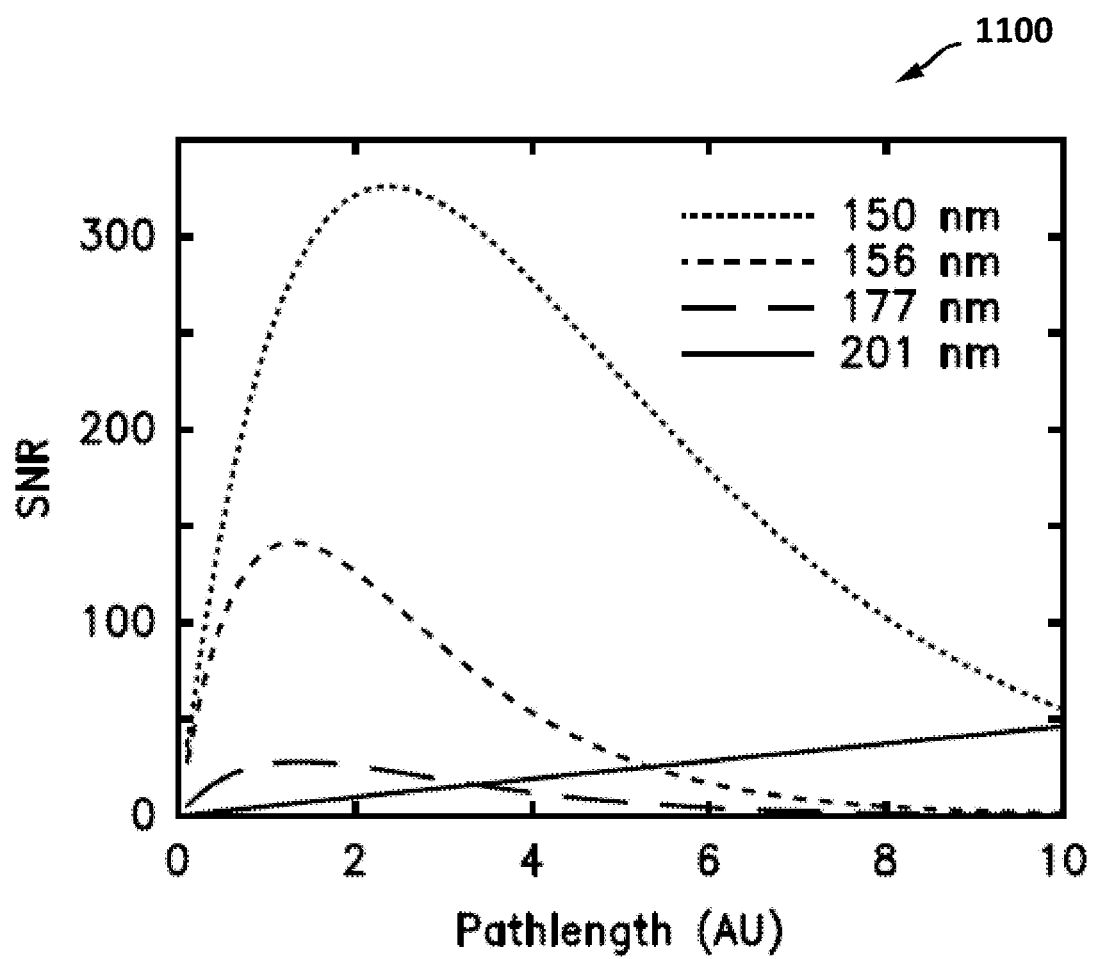
FIG. 11 is a graph illustrating signal-to-noise ratios (SNRs) at four wavelengths (150 nm, 156 nm, 177 nm, and 201 nm) plotted as a function of optical pathlength for the detection of acetic acid in water.

The graph 1100 shown in FIG. 11 plots the SNRs detected at four different wavelengths (150 nm, 156 nm, 177 nm and 201 nm) as a function of optical pathlength for the detection of acetic acid in water. The solid line, corresponding to the results at 201 nm, rises linearly as the optical pathlength is increased, since acetic acid is weakly absorbing and water is essentially transparent at this wavelength. It follows that, for every increase in pathlength, a corresponding improvement in detector sensitivity can be expected. While other considerations (e.g., temporal resolution, etc.) prevent the optical pathlength from being extended indefinitely, this is generally the circumstance encountered when utilizing UV detection.

The situation is more involved when measurements are performed in spectral regions where the mobile phase is appreciably absorbing. The long-dashed line in FIG. 11, corresponding to the results at 177 nm, initially surpasses the 201 nm curve but tapers off soon thereafter and asymptotically falls to zero as the optical pathlength increases. The larger initial SNR values detected at 177 nm are the result of the higher absorbance contrast between acetic acid at water at 177 nm, while the subsequent drop is a consequence of the non-zero absorbance of water. It follows that measurements performed at 201 nm using a longer pathlength flow cell would be more sensitive than measurements performed at 177 nm using a shorter one.

The short-dashed line in FIG. 11 presents the results for measurements performed at 156 nm. While the behavior is similar to the 177 nm result, the maximum SNR value attained at 156 nm using a short pathlength flow cell is more than 3× greater than the 201 nm result using a longer pathlength flow cell. The improved performance at 156 nm is a consequence of two factors: a greater absorbance contrast between acetic acid and water, and a lower absorbance cross-section for water, resulting in higher optical throughput.

The dotted line in FIG. 11 corresponds to the results for measurements performed at 150 nm. The further increase in the absorbance contrast between acetic acid and water, combined with the lower absorbance cross-section for water results in a further improvement in detector performance. In fact, the 150 nm result outperforms the 201 nm result over all pathlengths considered and offers a 7× improvement in sensitivity at its peak.

To aid in the method development process and ensure optimum detector sensitivity is realized, it follows there would be great benefit in the creation of a simulation tool whereby the expected SNR as a function of pathlength and wavelength could be evaluated for any combination of analytes and mobile phase solvents. Furthermore, it follows that there would also be great benefit from a LC-VUV detector design that incorporates a modular flow cell, similar to that shown in FIGS. 3, 5, 6A-6B and 7A-7B, so that flow cells with different optical pathlengths can be readily interchanged depending on the needs of a specific application.

Figure 12:
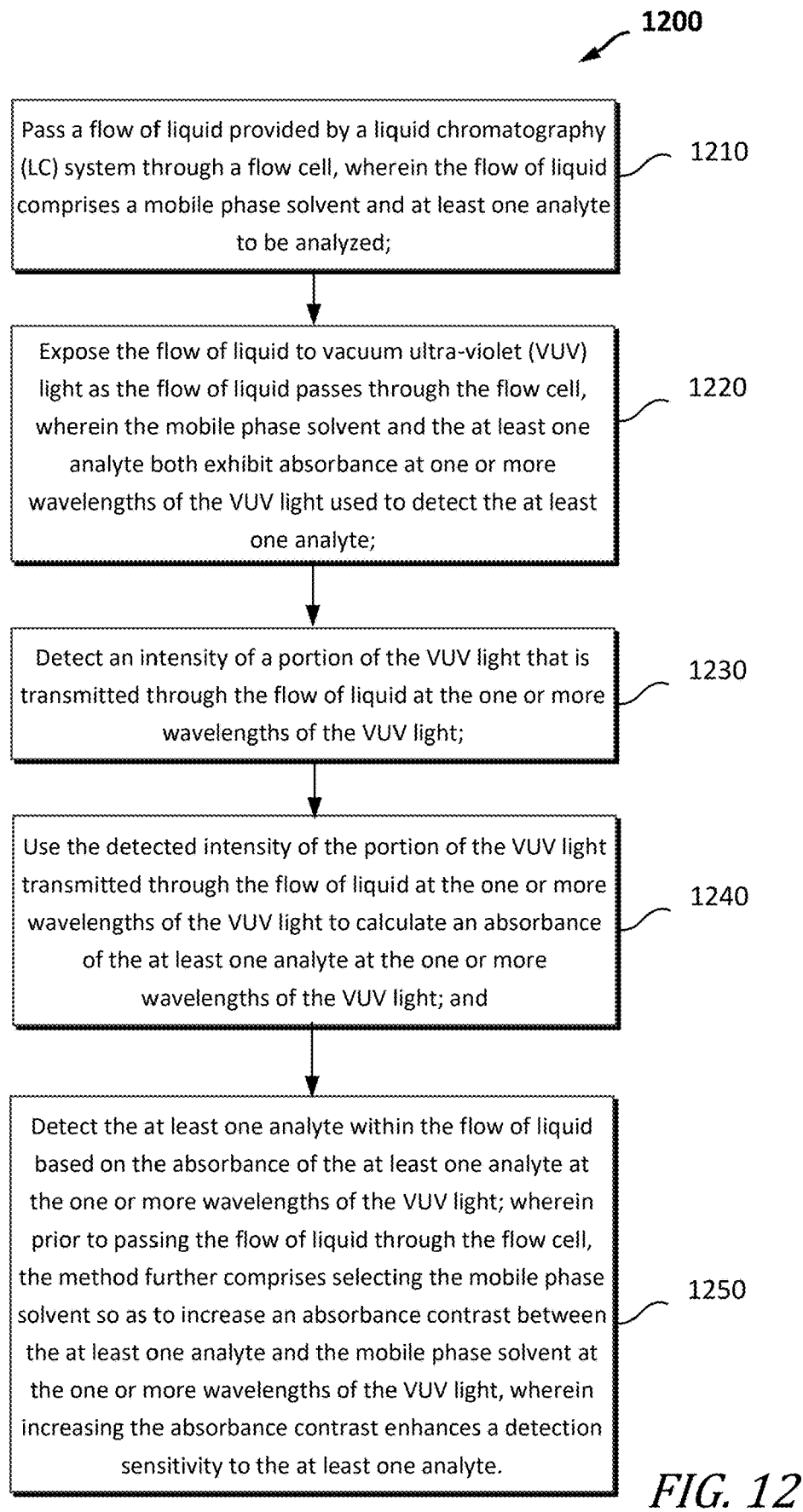
FIG. 12 is a flowchart diagram illustrating one embodiment of a method that utilizes the absorbance contrast between an analyte and a mobile phase solvent within a liquid sample to improve detection sensitivity of an LC-VUV detector.

FIG. 12 illustrates one embodiment of a method 1200 that utilizes the absorbance contrast between an analyte and a mobile phase solvent within a liquid sample to improve the detection sensitivity of an LC-VUV detector. It will be recognized that the embodiment shown in FIG. 12 is merely exemplary and additional methods may utilize the techniques described herein. Further, additional processing steps may be added to the method shown in the FIG. 12 as the steps described are not intended to be exclusive. Moreover, the order of the steps is not limited to the order shown in the figure as different orders may occur and/or various steps may be performed in combination or at the same time.

The method 1200 shown in FIG. 12 begins by passing a flow of liquid provided by a liquid chromatography (LC) system through a flow cell (in step 1210) and exposing the flow of liquid to vacuum ultra-violet (VUV) light as the flow of liquid passes through the flow cell (in step 1220). The flow of liquid passed through the flow cell in step 1210 may generally include a mobile phase solvent and at least one analyte to be analyzed. The mobile phase solvent and the at least one analyte may both exhibit absorbance at one or more wavelengths of the VUV light used to detect the at least one analyte. The method 1200 may further include: (a) detecting an intensity of a portion of the VUV light that is transmitted through the flow of liquid at the one or more wavelengths of the VUV light (in step 1230), (b) using the detected intensity of the portion of the VUV light transmitted through the flow of liquid at the one or more wavelengths of the VUV light to calculate an absorbance of the at least one analyte at the one or more wavelengths of the VUV light (in step 1240), and (c) detecting the at least one analyte within the flow of liquid based on the absorbance of the at least one analyte at the one or more wavelengths of the VUV light (in step 1250).

Prior to passing the flow of liquid through the flow cell in step 1210, the method 1200 may further include selecting the mobile phase solvent so as to increase an absorbance contrast between the at least one analyte and the mobile phase solvent at the one or more wavelengths of the VUV light. By increasing the absorbance contrast, the method 1200 may enhance a detection sensitivity to the at least one analyte.

In some embodiments, the mobile phase solvent selected for use with the at least one analyte may be less absorbing than the at least one analyte at the one or more wavelengths of the VUV light. In such embodiments, the absorbance contrast between the at least one analyte and the mobile phase solvent may be positive at the one or more wavelengths of the VUV light.

In some embodiments, the mobile phase solvent selected for use with the at least one analyte may be more absorbing than the at least one analyte at the one or more wavelengths of the VUV light. In such embodiments, the absorbance contrast between the at least one analyte and the mobile phase solvent may be negative at the one or more wavelengths of the VUV light.

In some embodiments, the method 1200 may further include adding at least one of a buffer, a modifier or an additive to the mobile phase solvent, prior to passing the flow of liquid through the flow cell in step 1210, to increase the absorbance contrast and further enhance the detection sensitivity to the at least one analyte.

The method 1200 shown in FIG. 12 utilizes the optical contrast (or absorbance contrast) between an analyte and a mobile phase solvent within a flow of liquid to improve the detection sensitivity to the analyte at the VUV wavelength(s) used to detect the analyte. Because the VUV wavelength(s) used to detect the analyte are below an ultra-violet (UV) cut-off for the mobile phase solvent, the analyte cannot be detected using conventional LC-UV detectors and methods that utilize wavelengths greater than 200 nm. In some embodiments, the method 1200 may be performed using the flow cell 300 shown and described herein. In such embodiments, the method 1200 may further include selecting an optical pathlength of the flow cell to further enhance the detection sensitivity to the at least one analyte.

UV Photolysis to Enhance Detector Sensitivity

VUV photons possess considerable energy and can induce photolysis under the appropriate circumstances. When employing typical HPLC flow rates (e.g., 0.1-2.0 µL/min), it is unlikely that significant photolysis effects would be observed when using the focused-beam LC-VUV detector described herein since the linear velocity of molecules through the ultra-short pathlength flow cell 300 cell is quite high, resulting in short residence times. In another embodiment of the present disclosure, appropriate steps can be taken to intentionally lower the flow rate through the flow cell 300 (e.g., <0.1 µL/min). In this manner, the linear velocity could be reduced, thus increasing the residence time, and creating conditions more conducive to the observation of significant photolysis. The lowering of flow rate can be accomplished directly through the LC system, by increasing the optical pathlength of the flow cell 300, or by any number of other means including incorporation of a flow splitter.

With the flow rate sufficiently lowered, photolysis effects can be manipulated to enhance detector sensitivity by altering the absorption properties of the molecules undergoing reaction. Photolysis can produce a range of photo-products including luminescence, energy transfer, photo-ionization, photo-dissociation, rearrangement and reaction products. In situations wherein the reaction products are gaseous in nature, it may prove beneficial to orient the flow cell vertically so that the flow of liquid from the LC column enters the flow cell at the bottom and exits at the top. This would ensure that the buoyant forces acting on the gaseous reaction products would be aligned with, and not counter to, the direction of liquid flow.

Photo-products may be more absorbing than the original photo-reactants, in some situations, while in others they may be less. As such, photolysis effects may be used to render analytes and/or mobile phase constituents more or less absorbing so as to favorably affect the optical contrast between them. In other instances, photolysis effects may alter analytes in a manner which renders them more easily distinguishable from each other, thereby enhancing selectivity. In yet other cases, the analytes and mobile phase constituents could be selected so as to facilitate the study of chemical reactions either in the flow cell or after leaving the LC-VUV detector.

Depending on the requirements of a given application, the flow rate through the LC-VUV detector could be fixed throughout the measurement or adjusted during the run to achieve the desired effect. In some instances, it may prove beneficial to employ some combination of faster and slower flow rates throughout a given measurement, or to stop the flow altogether for some time.

Changing the flow rate through the flow cell represents one technique that can be used to manipulate photolysis effects during LC-VUV analysis. To suppress photolysis effects, a VUV light source with lower power output and/or lower energy photons could be incorporated within the LC-VUV detector. For example, a deuterium lamp equipped with a fused silica window (instead of $MgF_2$) could be used to suppress photolysis effects. Alternatively, a lamp with higher radiance could be used to enhance photolysis effects. In other situations, it may be desirable to adjust the power and/or spectral output of the VUV light source from run to run, or during a given measurement. The power adjustment could be achieved through control of the lamp power supply, while the spectral output could be adjusted though introduction of a fixed or adjustable wavelength filter. In some embodiments, additional high-energy/high-power light sources may be used to enhance photolysis effects during part, or all, of a given measurement to enhance sensitivity and/or selectivity. In addition, special coatings with sufficient VUV-transparency could be applied to the interior surface of the exposed polyimide-free region 314 of the sample tube 302 to further promote photolysis effects where desired. In other situations, coatings could also be applied to the exterior surface of the polyimide-free region 314 of the sample tube 302 to modify its transmission properties. Using the modular flow cell 300 design disclosed herein, flow cells with or without such coatings could be easily interchanged, when necessary.

Figure 13:
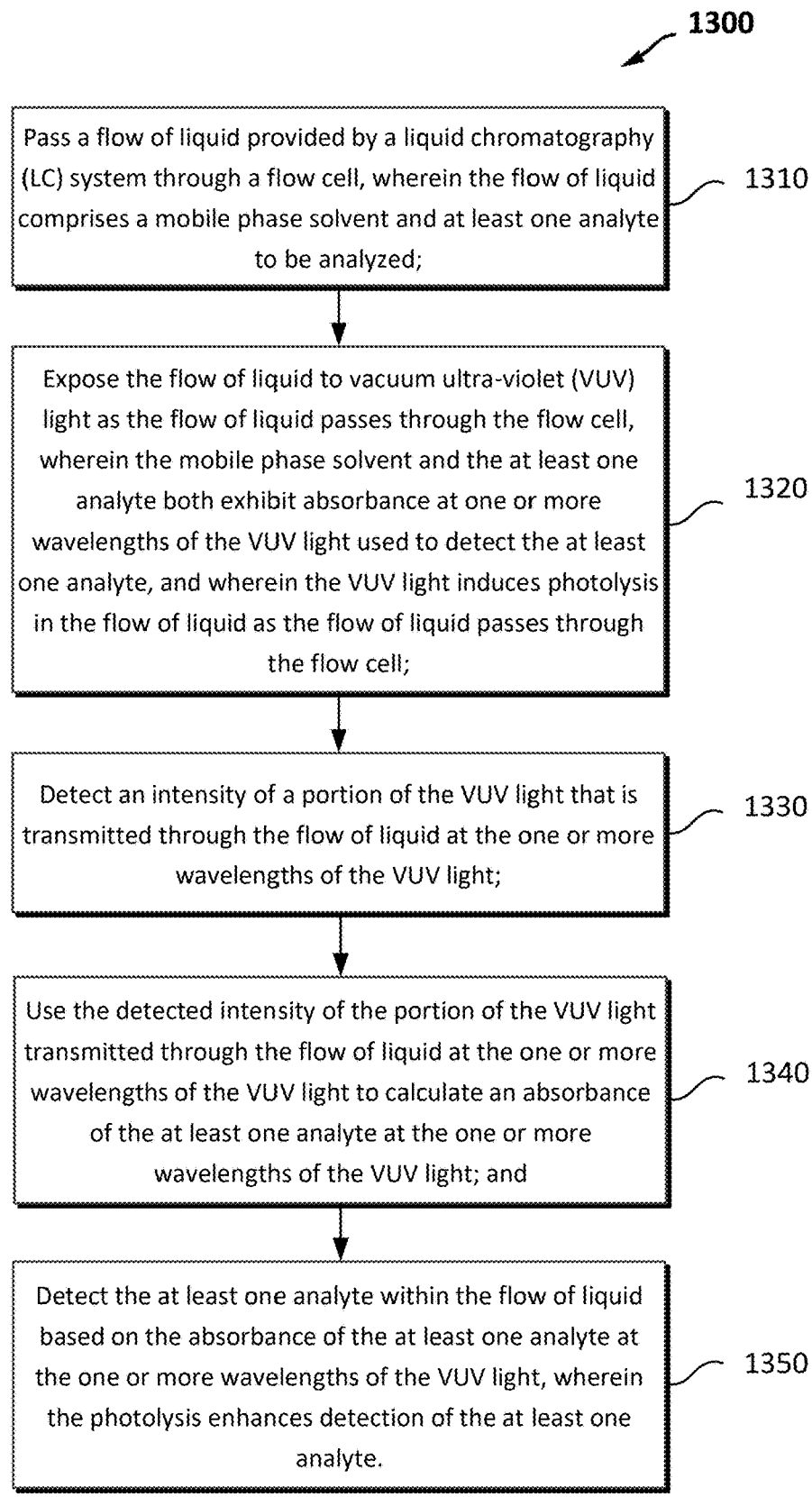
FIG. 13 is a flowchart diagram illustrating one embodiment of a method that utilizes photolysis of a liquid sample to improve detection sensitivity of an LC-VUV detector.

FIG. 13 illustrates one embodiment of a method 1300 that utilizes photolysis of a liquid sample to improve detection sensitivity of an LC-VUV detector. It will be recognized that the embodiment shown in FIG. 13 is merely exemplary and additional methods may utilize the techniques described herein. Further, additional processing steps may be added to the method shown in the FIG. 13 as the steps described are not intended to be exclusive. Moreover, the order of the steps is not limited to the order shown in the figure as different orders may occur and/or various steps may be performed in combination or at the same time.

The method 1300 shown in FIG. 13 begins by passing a flow of liquid provided by a liquid chromatography (LC) system through a flow cell (in step 1310) and exposing the flow of liquid to vacuum ultra-violet (VUV) light as the flow of liquid passes through the flow cell (in step 1320). The flow of liquid passed through the flow cell in step 1310 may generally include a mobile phase solvent and at least one analyte to be analyzed. The mobile phase solvent and the at least one analyte may both exhibit absorbance at one or more wavelengths of the VUV light used to detect the at least one analyte. The VUV light may induce photolysis in the flow of liquid as the flow of liquid passes through the flow cell. The method 1300 may further include: (a) detecting an intensity of a portion of the VUV light that is transmitted through the flow of liquid at the one or more wavelengths of the VUV light (in step 1330), (b) using the detected intensity of the portion of the VUV light transmitted through the flow of liquid at the one or more wavelengths of the VUV light to calculate an absorbance of the at least one analyte at the one or more wavelengths of the VUV light (in step 1340), and (c) detecting the at least one analyte within the flow of liquid based on the absorbance of the at least one analyte at the one or more wavelengths of the VUV light (in step 1350).

In the method 1300, the photolysis induced in step 1320 enhances detection of the at least one analyte in step 1350. In some embodiments, the photolysis may enhance detection of the at least one analyte by modifying the at least one analyte. In other embodiments, the photolysis may enhance detection of the at least one analyte by modifying the mobile phase solvent. In yet other embodiments, the photolysis may enhance detection of the at least one analyte in light of a second analyte included within the flow of liquid.

In some embodiments, the photolysis induced within the flow of liquid in step 1320 may be controlled to adjust an extent to which the photolysis enhances detection of the at least one analyte. For example, the method 1300 may control the photolysis induced within the flow of liquid by adjusting a power output of a light source coupled to provide the VUV light, adjusting a spectral output of the light source coupled to provide the VUV light and/or adjusting a flow rate of the flow of liquid passing through the flow cell.

The method 1300 shown in FIG. 13 utilizes photolysis of a liquid sample comprising an analyte to improve the detection sensitivity to the analyte at the VUV wavelength(s) used to detect the analyte. As noted above, the photolysis induced within the flow of liquid may enhance detection of the analyte by modifying the analyte or by modifying the mobile phase solvent. In some embodiments, the photolysis effects induced within the flow of liquid may increase the detection sensitivity of the LC-VUV detector comprising the flow cell. In other embodiments, a second detector may be coupled to the LC-VUV detector to receive the flow of liquid exiting the flow cell, and the second detector may be configured to detect a result of the photolysis.

Combining Two or More Detectors

The LC-VUV detector embodiments described above are to first-order non-destructive. In addition, the embodiments do not adversely affect the temporal resolution of the liquid sample stream, since the flow cell volumes are very small. It follows that they would not appreciably degrade the LC separation and could be used in combination with one or more other LC detectors to provide further insight into the analytes of interest. If the LC-VUV detector described herein is used in series with a destructive detector, the LC-VUV detector should be installed first. If the LC-VUV detector described herein is used in series with other non-destructive detectors, it can be used before or after said other non-destructive detectors.

LC detectors that may be particularly well-suited for use in combination with the LC-VUV detector described herein include, but are not limited to, UV absorbance (photodiode array and tunable), UV fluorescence, mass-spectrometer (MS), refractive index (RI), charged aerosol (CAD), evaporative light scattering (ELSD) and pH and conductivity. In situations where photolysis effects are exploited during LC-VUV analysis, other non-destructive detectors can precede the LC-VUV detector and then either non-destructive or destructive detectors can follow the LC-VUV detector. This may prove particularly useful in cases where the photolysis effects modify the sample stream in such a manner as to enhance subsequent analysis.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention shown and described herein are to be taken as presently preferred embodiments. Equivalent elements may be substituted for those illustrated and describe herein and certain features of the invention may be utilized independently of the use of other features, all as would be apparent to one skilled in the art after having the benefit of this description of the invention.

What is claimed is:

1. A vacuum ultraviolet (VUV) spectroscopy system, comprising:
   a light source configured to provide vacuum ultra-violet (VUV) light at one or more VUV wavelengths;
   a flow cell coupled to receive a flow of liquid from a liquid chromatography (LC) system, the flow cell comprising:
      a flow cell housing;
      a sample tube provided within the flow cell housing to receive the flow of liquid from the LC system, wherein the sample tube is a cylindrical tube, which is optically transmissive at the one or more VUV wavelengths; and
      a precision tube guide provided within the flow cell housing to position the sample tube at a focal point of the VUV light, wherein the precision tube guide comprises: (a) an aperture that is coupled to receive the VUV light, and (b) an optical path through the flow cell that permits the VUV light received by the aperture to pass through the sample tube and the flow of liquid flowing through the sample tube before exiting the flow cell; and
   a detector coupled to detect a portion of the VUV light that is transmitted through the flow of liquid flowing through the sample tube.

2. The VUV spectroscopy system of claim 1, wherein the precision tube guide comprises:
   a first channel that extends along a longitudinal axis of the precision tube guide, wherein the sample tube is inserted within the first channel to position a cross-sectional area of the sample tube in a plane perpendicular to the longitudinal axis of the precision tube guide; and
   a second channel that extends through the precision tube guide in a direction perpendicular to the longitudinal axis of the precision tube guide, wherein the second channel provides the optical path through the flow cell that permits the VUV light to pass through the sample tube and the flow of liquid flowing through the sample tube, and wherein an opening on one side of the second channel provides the aperture, which is coupled to receive the VUV light.

3. The VUV spectroscopy system of claim 1, further comprising a first VUV optic coupled between the light source and the flow cell to direct a focused beam of the VUV light to the aperture provided within the precision tube guide.

4. The VUV spectroscopy system of claim 3, wherein a width of the aperture is smaller than a diameter of the sample tube to ensure that the focused beam of VUV light received by the aperture passes through the sample tube and not around the sample tube.

5. The VUV spectroscopy system of claim 4, wherein the width of the aperture is less than one-half of the diameter of the sample tube.

6. The VUV spectroscopy system of claim 4, wherein the diameter of the sample tube corresponds to an optical pathlength of the flow cell, and wherein the diameter of the sample tube ranges between 25 μm and 530 μm.

7. The VUV spectroscopy system of claim 3, further comprising a second VUV optic coupled to receive the VUV light transmitted through the flow of liquid flowing through the sample tube, wherein an optical path extending between the first VUV optic and the second VUV optic is optically aligned with the optical path through the flow cell.

8. The VUV spectroscopy system of claim 7, further comprising a chamber housing containing at least the flow cell, the first VUV optic and the second VUV optic, the chamber housing providing a controlled environment.

9. The VUV spectroscopy system of claim 8, wherein the chamber housing comprises one or more optical alignment paths through which the aperture is illuminated to align the optical path extending between the first VUV optic and the second VUV optic with the optical path through the flow cell.

10. The VUV spectroscopy system of claim 8, wherein the flow cell is removably coupled to the chamber housing.

11. The VUV spectroscopy system of claim 8, wherein the flow cell is fixedly attached to the chamber housing.

12. The VUV spectroscopy system of claim 8, wherein the chamber housing comprises a flow cell port configured to receive and position the flow cell within the chamber housing, and wherein the flow cell port extends through the chamber housing in a direction, which is perpendicular to the optical path extending between the first VUV optic and the second VUV optic.

13. The VUV spectroscopy system of claim 12, wherein the flow cell housing comprises one or more alignment pins, wherein when the flow cell is received within the flow cell port, the one or more alignment pins couple with one or more holes provided within the flow cell port to align the flow cell within the flow cell port and ensure that the sample tube is positioned at the focal point of the VUV light.

14. The VUV spectroscopy system of claim 12, wherein the flow cell is removably coupled to the flow cell port.

15. The VUV spectroscopy system of claim 12, further comprising a plurality of seals coupled between the flow cell housing and the flow cell port, wherein the plurality of seals prevent air or gas outside of the flow cell from reaching a detection area within the flow cell when the flow cell is received within the flow cell port.

16. The VUV spectroscopy system of claim 12, wherein when the flow cell is removed from the flow cell port, the flow cell port is configured to receive a second flow cell having an optical pathlength, which differs from an optical pathlength of the flow cell.

17. The VUV spectroscopy system of claim 16, wherein the second flow cell comprises:
a second flow cell housing;
a second sample tube provided within the second flow cell housing to receive the flow of liquid from the LC system, wherein the second sample tube is a cylindrical tube, which is optically transmissive at the one or more VUV wavelengths; and
a second precision tube guide provided within the second flow cell housing to position the second sample tube at the focal point of the VUV light, wherein the second precision tube guide comprises: (a) a second aperture that is coupled to receive the VUV light, and (b) a second optical path through the second flow cell that permits the VUV light received by the second aperture to pass through the second sample tube and the flow of liquid flowing through the second sample tube before exiting the second flow cell;
wherein a diameter of the second sample tube differs from a diameter of the sample tube to provide the second flow cell with the optical pathlength, which differs from the optical pathlength of the flow cell.

18. A method, comprising:
passing a first flow of liquid provided by a liquid chromatography (LC) system through a first flow cell arranged within an LC-VUV detector, wherein the first flow cell comprises:
a first flow cell housing; and
a first sample tube provided within the first flow cell housing for receiving the first flow of liquid from the LC system, wherein the first sample tube is a cylindrical tube, which is optically transmissive at vacuum ultra-violet (VUV) wavelengths;
exposing the first flow of liquid to VUV light as the first flow of liquid passes through the first sample tube of the first flow cell, wherein the first flow cell further comprises:
a first precision tube guide provided within the first flow cell housing for positioning the first sample tube at a focal point of the VUV light, wherein the first precision tube guide comprises: (a) a first aperture that is coupled to receive the VUV light, and (b) a first optical path through the first flow cell that permits the VUV light received by the first aperture to pass through the first sample tube and the first flow of liquid flowing through the first sample tube before exiting the first flow cell;
detecting a portion of the VUV light that is transmitted through the first optical path provided within the first precision tube guide and the first flow of liquid flowing through the first sample tube;
determining at least one analyte within the first flow of liquid based on said detecting;
removing the first flow cell from the LC-VUV detector; and
inserting a second flow cell within the LC-VUV detector, the second flow cell having an optical pathlength that differs from the first flow cell.

19. The method of claim 18, wherein said exposing the first flow of liquid to the VUV light comprises:
exposing the first flow of liquid to a wavelength of the VUV light, wherein the wavelength is less than 200 nm.

20. The method of claim 19, wherein said detecting the portion of the VUV light that is transmitted through the first optical path provided within the first precision tube guide and the first flow of liquid passing through the first sample tube comprises:
detecting an intensity of the portion of the VUV light that is transmitted through the first flow of liquid at the wavelength.

21. The method of claim 20, wherein said determining the at least one analyte within the first flow of liquid based on said detecting comprises:
using the detected intensity of the portion of the VUV light transmitted through the first flow of liquid at the wavelength to calculate: (a) a transmittance through the first flow of liquid at the wavelength, or (b) an absorbance of the at least one analyte within the first flow of liquid at the wavelength; and determining the at least one analyte within the first flow of liquid based on: (a) the transmittance through the first flow of liquid at the wavelength, or (b) the absorbance of the at least one analyte within the first flow of liquid at the wavelength.

22. The method of claim 18, further comprising:

passing a second flow of liquid provided by the LC system through the second flow cell inserted within the LC-VUV detector, wherein the second flow cell comprises:
- a second flow cell housing; and
- a second sample tube provided within the second flow cell housing to receive the second flow of liquid from the LC system, wherein the second sample tube is a cylindrical tube, which is optically transmissive at the one or more VUV wavelengths, and wherein a diameter of the second sample tube differs from a diameter of the first sample tube to provide the second flow cell with the optical pathlength, which differs from the optical pathlength of the first flow cell;

exposing the second flow of liquid to the VUV light as the second flow of liquid passes through the second sample tube of the second flow cell, wherein the second flow cell further comprises:
- a second precision tube guide provided within the second flow cell housing to position the second sample tube at the focal point of the VUV light, wherein the second precision tube guide comprises: (a) a second aperture that is coupled to receive the VUV light, and (b) a second optical path through the second flow cell that permits the VUV light received by the second aperture to pass through the second sample tube and the second flow of liquid flowing through the second sample tube before exiting the second flow cell;

detecting a portion of the VUV light that is transmitted through the second optical path provided within the second precision tube guide and the second flow of liquid flowing through the second sample tube; and determining at least one analyte within the second flow of liquid based on said detecting.

23. The method of claim 22, wherein said exposing the second flow of liquid to the VUV light comprises:

exposing the second flow of liquid to a wavelength of the VUV light, wherein the wavelength is less than 200 nm.

24. The method of claim 23, wherein said detecting the portion of the VUV light that is transmitted through the second optical path provided within the second precision tube guide and the second flow of liquid passing through the second sample tube comprises:

detecting an intensity of the portion of the VUV light that is transmitted through the second flow of liquid at the wavelength.

25. The method of claim 24, wherein said determining the at least one analyte within the second flow of liquid based on said detecting comprises:

using the detected intensity of the portion of the VUV light transmitted through the second flow of liquid at the wavelength to calculate: (a) a transmittance through the second flow of liquid at the wavelength, or (b) an absorbance of the at least one analyte within the second flow of liquid at the wavelength; and determining the at least one analyte within the second flow of liquid based on: (a) the transmittance through the second flow of liquid at the wavelength, or (b) the absorbance of the at least one analyte within the second flow of liquid at the wavelength.

26. The method of claim 22, further comprising selecting the optical pathlength of the second flow cell to enable determination of the at least one analyte within the second flow of liquid, wherein the at least one analyte within the second flow of liquid differs from the at least one analyte within the first flow of liquid.

27. The method of claim 22, wherein the second flow of liquid is exposed to a wavelength of the VUV light that is less than 200 nm, wherein the second flow of liquid comprises the at least one analyte and a mobile phase solvent, wherein the at least one analyte and the mobile phase solvent are both absorbing at the wavelength of the VUV light, and wherein the method further comprises selecting the optical pathlength of the second flow cell to improve detection of the at least one analyte at the wavelength of the VUV light.

28. The method of claim 22, wherein said exposing the second flow of liquid to the VUV light induces photolysis within the second flow of liquid, and wherein the method further comprises selecting the optical pathlength of the second flow cell to create conditions conducive to observing the photolysis within the second flow of liquid.

* * * * *